United States Patent [19]

Yamaga et al.

[11] E Re. 31,090

[45] Reissued Nov. 30, 1982

[54] ELECTRONIC MUSICAL INSTRUMENT

[75] Inventors: Eiichi Yamaga; Akira Nakada; Takatoshi Okumura; Eiichiro Aoki; Akiyoshi Oya; Yasuji Uchiyama, all of Hamamatsu, Japan

[73] Assignee: Nippon Gakki Seizo Kabushiki Kaisha, Hamamatsu, Japan

[21] Appl. No.: 221,578

[22] Filed: Dec. 31, 1980

Related U.S. Patent Documents

Reissue of:

[64] Patent No.: 4,192,211
Issued: Mar. 11, 1980
Appl. No.: 929,007
Filed: Jul. 28, 1978

[30] Foreign Application Priority Data

Aug. 5, 1977 [JP] Japan ..... 52-93992
Aug. 23, 1977 [JP] Japan ..... 52-100966

[51] Int. Cl.³ ..... G10H 1/00; G10H 5/00; G10H 7/00

[52] U.S. Cl. ..... 84/1.01; 340/365 S

[58] Field of Search ..... 84/1.01, 1.03, 1.24; 340/365 R, 365 S

[56] References Cited

U.S. PATENT DOCUMENTS

| | | | |
|---|---|---|---|
| 4,134,320 | 1/1979 | Oya | 84/1.01 |
| 4,134,321 | 1/1979 | Woron | 84/1.24 X |
| 4,141,268 | 2/1979 | Kugisawa | 84/1.03 |
| 4,142,433 | 3/1979 | Gross | 84/1.03 |

*Primary Examiner*—S. J. Witkowski
*Attorney, Agent, or Firm*—Spensley, Horn, Jubas & Lubitz

[57] ABSTRACT

A tone production assignment circuit produces control information representing assigned key code, key-on etc. Such information has a large number of bits with respect to each channel. A multiplexing circuit has output lines the number of which is smaller than the bit number of the information and divides the information with a plurality of time slots with respect to one channel. The multiplexing circuit is controlled by a signal from a timing signal generation circuit. The multiplexing circuit is capable of rearranging information for transmitting information required for the respective individual channels and also capable of inserting a timing data in an available time slot. A multiple data analysis circuit decodes the information provided by the multiplexing circuit. Tone generators are provided for the respective channels and each one of them functions to latch only corresponding information among the decoded information by a latch circuit.

13 Claims, 17 Drawing Figures

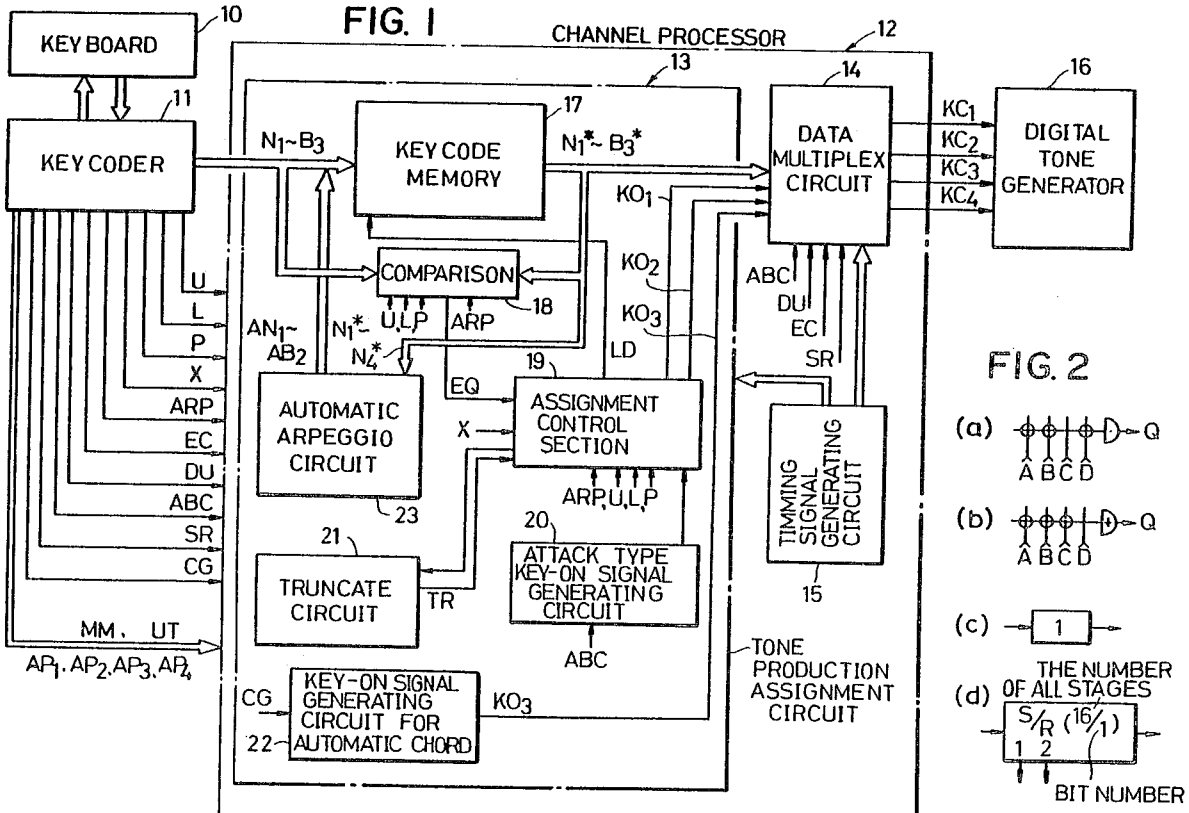
FIG. 1
FIG. 2
KEY BOARD
KEY CODER
CHANNEL PROCESSOR
KEY CODE MEMORY
COMPARISON
DATA MULTIPLEX CIRCUIT
DIGITAL TONE GENERATOR
TIMMING SIGNAL GENERATING CIRCUIT
TONE PRODUCTION ASSIGNMENT CIRCUIT
ASSIGNMENT CONTROL SECTION
ATTACK TYPE KEY-ON SIGNAL GENERATING CIRCUIT
AUTOMATIC ARPEGGIO CIRCUIT
TRUNCATE CIRCUIT
KEY-ON SIGNAL GENERATTING CIRCUIT FOR AUTOMATIC CHORD
THE NUMBER OF ALL STAGES
BIT NUMBER 1μs
(a) CHANNEL
TIME
(b) YUK
(c) YLK
(d) YPK
(e) YAR
(f) H1
(g) H2
(h) H3
(i) ΦA
(j) ΦB
(k)
(l)
(m) Y48
(n) BO
(o)
(p)
1ST PROCESSING PERIOD
2ND PROCESSING PERIOD
3RD PROCESSING PERIOD
TIME WIDTH FOR DELIVERING ONE KEYCODE
Y48
Y30
Y31
Y33
Y34
Y36
TIME 15
Y48
Y7
ΦB
ΦA
Y31
Y30
Y36
Y34
Y33
BO
YH2
YAR2
YPK2
YLK2
YLK1
YUK2
YUK1
231
229
238
235
234
195
193
197
108
199
69
68
67
66
YUK
YLK
YPK
YAR
C16
54
55
H1
H2
H3
30
29
1/3 FREQ. DIVISION
COUNTER
24
25
26
S/R (16/1)
27
28
70
71
109
198
196
194
123
122
121
120
T
TEST
COUNT
RESET
IC
"1"

DIGITAL COMPARATOR
S/R (16/1)
TO AUTOMATIC ARPEGGIO CIRCUIT 23
FROM AUTOMATIC ARPEGGIO CIRCUIT 23
KON
LD
BO
SR
ABC
DU
EC
ARP
EQ
YUK
YLK
YPK

| TIME SLOT | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| KC1 | "1" | B1 | N1 | | B1 | N1 | | B1 | N1 | | B1 | N1 | | B1 | N1 | | B1 | N1 | | B1 | N1 | | B1 | N1 |
| KC2 | "1" | B2 | N2 | (TEST) | B2 | N2 | | B2 | N2 | | B2 | N2 | | B2 | N2 | | B2 | N2 | | B2 | N2 | | B2 | N2 |
| KC3 | "1" | DU | N3 | EC | B3 | N3 | | B3 | N3 | | B3 | N3 | | B3 | N3 | | B3 | N3 | | B3 | N3 | | B3 | N3 |
| KC4 | "1" | KO1 | N4 | KO2 | KO1 | N4 | KO2 | KO1 | N4 | KO2 | KO1 | N4 | KO2 | KO1 | N4 | KO2 | KO1 | N4 | KO2 | KO1 | N4 | KO2 | KO1 | N4 |
| KEYBOARD | | P | | | U | | | U | | | U | | | U | | | U | | | U | | | U | |
| CHANNEL | | 1 | | | 4 | | | 7 | | | 10 | | | 13 | | | 16 | | | 3 | | | 6 | |

| TIME SLOT | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|---|---|---|---|---|---|---|---|
| KC1 | | B1 | N1 | | B1 | N1 | | B1 | N1 | | B1 | N1 | | B1 | N1 | | B1 | N1 | | B1 | N1 | | B1 | N1 |
| KC2 | | B2 | N2 | | B2 | N2 | | B2 | N2 | | B2 | N2 | | B2 | N2 | | B2 | N2 | | B2 | N2 | | B2 | N2 |
| KC3 | | B3 | N3 | | B3 | N3 | | B3 | N3 | | B3 | N3 | | B3 | N3 | | B3 | N3 | | B3 | N3 | ABC | | N3 |
| KC4 | KO2 | KO1 | N4 | KO2 | KO1 | N4 | KO2 | KO1 | N4 | KO2 | KO1 | N4 | KO2 | KO1 | N4 | KO2 | KO1 | N4 | KO2 | KO1 | N4 | KO3 | SR | N4 |
| KEY BOARD | | L | | | L | | | L | | | L | | | L | | | L | | | L | | | ARP | |
| CHANNEL | | 9 | | | 12 | | | 15 | | | 2 | | | 5 | | | 8 | | | 11 | | | 14 | |

ELECTRONIC MUSICAL INSTRUMENT

Matter enclosed in heavy brackets [ ] appears in the original patent but forms no part of this reissue specification; matter printed in italics indicates the additions made by reissue.

BACKGROUND OF THE INVENTION

This invention relates to a compound tone type electronic musical instrument employing a tone production assignment circuit.

DESCRIPTION OF THE PRIOR ART

An electronic musical instrument is known in the art in which a tone selected by key depression is assigned to a suitable tone production channel by a tone tone production assignment circuit, and the tone is produced by using the tone generator of that channel. In producing a tone by using a tone generator, there are a number of pieces of information as to the tone which should be supplied to the tone generator. In a device disclosed by the specification of U.S. Pat. No. 3,882,751 entitled "Electronic Musical Instrument" or by the specification of U.S. Pat. No. 4,114,495, entitled "Channel Processor", in addition to information (key code) representative of a key name assigned to a relevant channel, information representative of the depression of the key, information representative of the release of the key, and clear information representative of the fact that the assignment to the channel has been cancelled are outputted by a tone production assignment circuit and are applied to a tone generator. The information (key code) representative of a key name consists of a note code representative of a note, an octave code representative of an octave, and a keyboard code representative of a keyboard. If key depression information and other control data are added to the aforementioned codes, data of the order of ten to fifteen bits is applied to the tone generator section from the tone production assignment section. In manufacturing the tone production assignment section and the tone generator section in the form of integrated circuits, it is required to provide as many pins as the number of bits of data used between the two sections. Therefore, as the number of bits of data supplied to the tone generator section from the tone production assignment circuit increases, the number of pins in the integrated circuit is increased, which will be an obstacle to miniaturization of the sections.

SUMMARY OF THE INVENTION

It is an object of the present invention to provide an electronic musical instrument including tone generators individually functioning for each of tone production channels, in which the number of wires between the tone production assignment circuit and the tone generators is remarkably reduced by supplying information concerning tones assigned to the respective channels to the tone generators in a time division multiplexed form. It is another object of the invention to provide an electronic musical instrument in which, in distributing the time division multiplexed information to the respective tone generators, timing for the distribution is determined by using single reference data representing a reference timing in a time slot train and information transmitted from the tone production assignment circuit to the tone generators thereby is simplified.

These and other objects and features of the present invention will become apparent from the description made below in conjunction with the accompanying drawings.

BRIEF DESCRIPTION OF THE DRAWINGS

In the accompanying drawings:

FIG. 1 is a block diagram illustrating one example of an electronic musical instrument according to this invention;

FIG. 2 is a diagram explaining a method of illustrating various circuit elements;

DETAILED DESCRIPTION OF THE INVENTION

Figure 3:
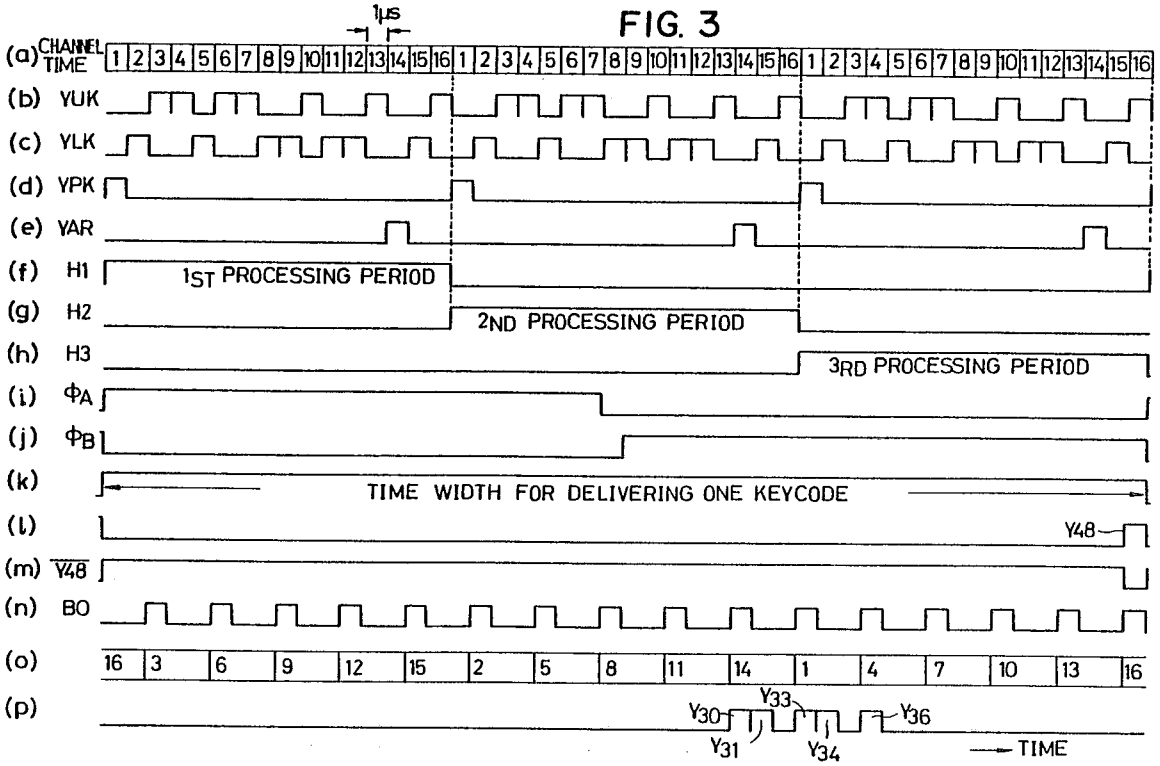
FIG. 3 is a timing chart of various signals employed for controlling a variety of circuits included in a channel processor shown in FIG. 1.

Description of the general arrangement of this invention

This invention will be described with reference to its preferred embodiment illustrated in the accompanying drawings.

Referring to FIG. 1, a keyboard section 10 comprises an upper keyboard, a lower keyboard, a pedal keyboard, and a variety of switches for control. A key coder *or key information generating means* 11 operates to detect the on-off operations of the keys and the switches in the key-board section 10, thereby to output pieces of information representative of depressed keys and various pieces of control information. A channel processor 12 comprises a tone production assignment circuit *or channel assignment means* 13, a data multiplex circuit 14, and a timing signal generating circuit 15 for the above-described assignment and multiplex. The tone production assignment circuit 13 is to assign a depressed key (or a tone to be produced) to any of a certain number (sixteen, for instance) of tone production channels, and the assignment is carried out in accordance with information (key code) representative of a depressed key from the key coder 11. In this tone production assignment circuit 13, a key code memory circuit 17 has a certain number of memory positions, which corresponds to the number of tone production channels, the key code memory circuit 17 having a gate in its input side. As a result of an assignment operation, a key code $N_1$–$B_3$ delivered from the key coder 11 is stored in one of the memory positions in the key code memory circuit 17. The fundamental conditions in the assignment operation of the tone production assigning circuit 13 are as follows:

(A) The assignment should be done for a memory position where no storage is made (or an empty channel), and (B) A key code representative of the same key as a key (being depressed) whose tone is being produced should not be stored, in duplication, in a plurality of memory positions.

However, as far as the condition (B) concerns, in the case where the same key code as an old key code (not used for tone production) which is stored in a channel which is not in tone production (not in key depression) is newly supplied upon key depression, the new key code may be assigned to a different channel. Such assignment control is effected in the case of "key on again" described later.

A key code comparison circuit 18 operates to compare a key code $N_1$–$B_3$ applied thereto from the key coder 11 with an assigned key code $N_1$*–$B_3$* which has been stored in the memory circuit 17, and it outputs a comparison output EQ depending on coincidence or non-coincidence. An assignment control section 19 operates to detect whether the assignment conditions such as the above-described conditions (A) and (B) are satisfied or not. Upon satisfaction, the section 19 outputs a load signal LD which is applied to the key code memory circuit 17, thereby to cause the latter 17 to store an input key code $N_1$–$B_3$. In addition, the assignment control section provides a key-on signal $KO_1$ or $KO_2$ representative of the fact that a key assigned to a channel is being depressed.

An attack type key-on signal generating circuit 20 operates when an attack type envelope waveform is employed as a musical tone amplitude envelope, and the circuit 20 serves to reduce the generation time width of the key-on signal $KO_1$ or $KO_2$ provided by the assignment control section 19 to a relatively short time width (of the order of 10 ms, for instance). A truncate circuit 21 is to detect a channel to which a key which was released earliest is assigned, and the circuit 21 outputs a truncate channel designating signal TR in accordance with this detection. In the assignment control section 19, control is effected so that the old assignment of a channel represented by the truncate channel designating signal TR is cancelled and that a key newly depressed is assigned to that channel.

A key-on signal generating circuit 22 for automatic chords (hereinafter referred to as "an automatic chord key-on signal generating circuit 22" when applicable) outputs a key-on signal $KO_3$ in accordance with a signal CG representative of the tone production timing of an automatic chord. An automatic arpeggio circuit 23 detects successively the key codes $N_1$*–$B_3$* which have been stored in the key code memory circuit 17 and, for instance, concern the lower keyboard only, thereby to outputs the key codes $AN_1$–$AB_2$ of tones to be produced as automatic arpeggio tones. The key codes $AN_1$–$AB_2$ of automatic arpeggio tones are inputted in an arpeggio-only-channel of the key code memory circuit under the control of the assignment control section 19.

The timing signal generating circuit 15 outputs a timing signal for controlling the tone production assignment of the tone production assignment circuit 13, and a timing signal for controlling the time division multiplex operation of various pieces of information in the data multiplex circuit 14. The data multiplex circuit 14 multiplexes assigned key information (such as the key code $N_1$*–$B_3$*, and the key-on signals $KO_1$, $KO_2$ and $KO_3$) applied thereto from the tone production assignment circuit 13 and control information from the key coder 11 (or other relevant switches) into time division multiplexed data in accordance with the timing signal applied thereto from the timing signal generating circuit 15. Key information or control information of a large number of bits inputted into the data multiplex circuit 14 is multiplexed into data of a smaller number of bits (for instance, it is outputted as four-bit data $KC_1$, $KC_2$, $KC_3$ and $KC_4$). The multiplex data $KC_1$, $KD_2$, $KC_3$ and $KC_4$ outputted by the data multiplex circuit 14 are delivered, as the output of the channel processor 12, to a digital tone generator section 16. In the digital tone generator section 16, various pieces of information (such as the key codes $N_1$*–$B_3$*, the key-on signals $KO_1$, $KO_2$ and $KO_3$, and the control information) are restored from the multiplex data $KC_1$, $KC_2$, $KC_3$ and $KC_4$ thus delivered, separately according to the tone production channels, and in accordance with these pieces of information musical tone signals are provided separately according to the channels. The digital tone generator section 16 comprises a tone generator of the type that musical tone signals having tone pitches corresponding to digital information can be produced in accordance with the digital information. In the example shown in FIG. 1, the key coder 11 and the channel processor 12 is in the form of one chip of integrated circuit, while the digital tone generator section 16 is in the form of another chip of integrated circuit.

Detailed description of the constructions and operations of various sections

(1) Explanation of a Method of Illustrating Various Circuit Elements in the Accompanying Drawings, and Timing Signals:

FIG. 2 shows one example of a method of illustrating various circuit elements in the accompanying drawings. In FIG. 2, the part (a) shows a multiple-input type AND circuit; the part (b), a multiple-input type OR circuit; the part (c), a delay flip-flop, and the part (d), a shift register. In a multiple-input type logical circuit element (the part (a) or (b) in FIG. 2), one input line is provided on the input side of the circuit, a plurality of signal lines are intersected with the input line, and the point of intersection of a signal line for a signal to be inputted to the circuit and the input line is encircled.

Accordingly, the logical expression of the part (a) of FIG. 2 is $Q=A\cdot B\cdot D$, while the logical expression of the part (b) of FIG. 2 is $Q=A+B+C$. The digit "1" in the block indicating a delay flip-flop, as shown in the part (c) of FIG. 2, is intended to mean that input data is delayed by one bit time (one stage). In the part (d) of FIG. 2, the numerator of a fraction indicates the number of all stages in the shift register, while the denominator indicates the bit number of a stage. Where no clock pulse is indicated for a delay flip-flop or a shift register in a drawing, it should be understood that it is driven by a main clock pulse $\phi_1$ (which is, for instance, a two-phase clock pulse having a period of 1 $\mu$s). Where an output is led out of a stage in a shift register, the stage's order is indicated by a number in the block, from which an output line is extended.

In the tone production assignment circuit 13, the tone production channels are formed in time division manner. The time-division time slots of the channels are segregated successively with the timing of the main clock pulse $\phi_1$. In this example, the period of the main clock pulse $\phi_1$is one $\mu$s. The part (a) of FIG. 3 shows the channel time slots (channel times) in the tone production assignment circuit 13, and sixteen time slots each having a time width of 1 $\mu$s correspond the first through sixteenth channels, respectively.

In this example, the tone production channels are determined separately according to the keyboards, and the tone production assignment circuit 13 operates to assign key depression tones of relevant keyboards to any of the tone production channels thus determined. For instance, the upper keyboard tones are assigned to the third, fourth, sixth, seventh, tenth, thirteenth and sixteenth channels, while the lower keyboard tones are assigned to the second, fifth, eighth, ninth, eleventh, twelfth and fifteenth channels. The pedal keyboard tones are assigned to the first channel. The fourteenth channel is used for assigning the automatic arpeggio tones. Signals representative of the channels classified separately according to the keyboards and the functions as described above are outputted by the timing signal generating circuit 15.

Figure 4:
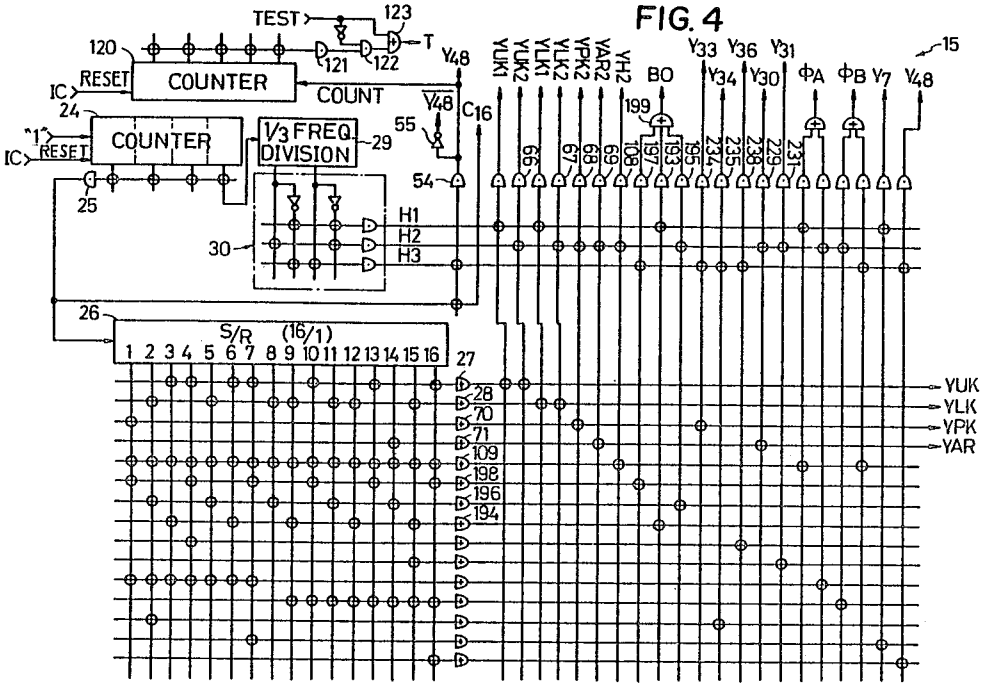
FIG. 4 is a block diagram illustrating a timing signal generating circuit in FIG. 1, in detail.

(2) Description of the Timing Signal Generating Circuit 15:

Shown in FIG. 4 is a detailed example of the timing signal generating circuit 15. A counter 24 comprising four $\frac{1}{2}$ frequency division flip-flops cascade-connected subjects the main clock pulse $\phi_1$ to 1/16 frequency division. This counter 24 is reset by an initial clear signal IC when the power switch is turned on, and thereafter it successively counts DC signals "1" applied to its count input terminal, with the timing of the main clock pulse $\phi_1$ (not shown). When the count value of the counter 24 reaches "1 1 1 1", an AND circuit 25 is operated to output a signal "1" having a time width of 1 $\mu$s. Thus, the AND circuit 25 outputs the signal "1" every 16 $\mu$s, and this output corresponds to the 16th channel time. The output of the AND circuit 25 is inputted into a 16-stage/1-bit shift register 26, where it is successively shifted according to the main clock pulse $\phi_1$ (not shown). Accordingly, a single signal "1" is held in the shift register 26, and this signal "1" is successively shifted toward the 16th stage from the first stage, as a result of which the channel time in time division manner as indicated in the part (a) of FIG. 3 is formed. The outputs of the 3rd, 4th, 6th, 7th, 10th and 13th stages in the shift register 26 are applied to an OR circuit 27, the output of which is used as an upper-keyboard-only channel signal YUK. Similarly, the outputs of the 2nd, 5th, 8th, 9th, 11th, 12th and 15th stages in the shift register 26 are applied to an OR circuit 28, the output of which is used as a lower-keyboard-only channel signal YLK. The output of the 1st stage in the shift register 26 is used as a pedal-keyboard-only channel signal YPK. In addition, the output of the 14th stage in the shift register 26 is used as an automatic-arpeggio-only signal YAR. The generation of these channels signals YUK, YLK, YPK and YAR are as indicated in the parts (b) through (e) of FIG. 3, respectively.

One cycle of processing operation in the channel processor 12 is accomplished in three circulations (48 $\mu$s) of the time division channel time. A signal H1 indicated in the part (f) of FIG. 3 shows the first 16 $\mu$s period (the first processing period) of one operation cycle taking 48 $\mu$s; a signal H2 indicated in the part (g) of FIG. 3 shows the second 16 $\mu$s period (the second processing period); and a signal H3 in the part (h) shows the last 16 $\mu$s period (the third processing period). A frequency division signal having a period of 16 $\mu$s outputted by the counter 24 in FIG. 4 is inputted to a $\frac{1}{3}$ frequency division circuit 29, from which a 2-bit output which is changed in three ways "0 0", "0 1" and "1 0" at the time intervals of 16 $\mu$s and repeats this change every 48 $\mu$s is obtained. This output of the $\frac{1}{3}$ frequency division circuit 29 is applied to a decoder 30, where the first, second and third processing period signals H1, H2 and H3 are obtained in correspondence to the outputs "0 0", "0 1" and "1 0", respectively.

The timing signal generating circuit 15 generates twophase clock pulses $\phi_A$, and $\phi_B$ each having a period of 48 $\mu$s as indicated in the parts (i) and (j) of FIG. 3, in accordance with the processing period signals H1, H2 and H3 and the contents of the shift register 26. The two-phase clock pulses $\phi_A$ and $\phi_B$ are used in the key coder 11 so as to deliver various data out of the latter 11 in synchronization with the period of 48 $\mu$s of each of the first, second and third processing period signals H1, H2 and H3.

(3) Description of the Key Coder 11

A key coder of the type that is disclosed by the specification of U.S. Pat. No. 4,114,495 may be preferably employed as the key coder 11. The key coder 11 operates to output key codes $N_1$–$B_3$ representative of keys depressed in the keyboard section 10. The key codes $N_1$–$B_3$ are outputted in time division manner at predetermined time intervals when the keys are depressed. This time interval is controlled by the aforementioned clock pulses $\phi_A$ and $\phi_B$ so as to have a time width of 48 $\mu$s in synchronization with the period of time from the rise of the pulse $\phi_A$ to the fall of the pulse $\phi_B$. For example, if the key code $N_1$–$B_3$ of a depressed key is applied to the channel processor 12 from the key coder 11 with the time width of 48 $\mu$s equal to the period of time from the rise of a clock pulse $\phi_A$ to a clock pulse $\phi_B$, then the key code $N_1$–$B_3$ of another depressed key is applied thereto in the period of time of 48 $\mu$s from the rise of the following clock pulse $\phi_A$ to the fall of the following clock $\phi_B$. The time width for delivering one key code $N_1$–$B_3$ from the key coder 11 is as indicated in the part (k) of FIG. 3.

The key code $N_1$–$B_3$ is a 7-bit data consisting of a note code $N_1$, $N_2$, $N_3$, $N_4$ representative of a note and a block code $B_1$, $B_2$, $B_3$ representative of an octave range. One example of the relations between the contents of note codes $N_1$–$N_4$ and notes is indicated in Table 1 below:

TABLE 1

| Note | $N_4$ | $N_3$ | $N_2$ | $N_1$ | Decimal notation |
|---|---|---|---|---|---|
| C# | 0 | 0 | 0 | 1 | 1 |
| C | 0 | 0 | 1 | 0 | 2 |
| D# | 0 | 0 | 1 | 1 | 3 |
| E | 0 | 1 | 0 | 1 | 5 |
| F | 0 | 1 | 1 | 0 | 6 |
| F# | 0 | 1 | 1 | 1 | 7 |
| G | 1 | 0 | 0 | 1 | 9 |
| G# | 1 | 0 | 1 | 0 | 10 |
| A | 1 | 0 | 1 | 1 | 11 |
| A# | 1 | 1 | 0 | 1 | 13 |
| B | 1 | 1 | 1 | 0 | 14 |
| C | 1 | 1 | 0 | 0 | 12 |

In Table 1, the note code $N_4$–$N_1$ of note C is "1 1 0 0" (decimal number 12); however, it is converted into "1 1 1 1" (decimal number 15) when it is practically used for musical tone production. The reason for this is that a reference data used for restoring multiplexed data is provided by the data multiplex circuit 14 so that it has a content "1 1 1 1", and accordingly it is necessary to avoid the duplication with this.

The relation-ships between the contents of block codes $B_1$–$B_3$ and octave ranges are indicated in Table 2 by way of example:

TABLE 2

| | | | Octave Range | | | |
|---|---|---|---|---|---|---|
| $B_3$ | $B_2$ | $B_1$ | Upper keyboard | Lower keyboard | Pedal keyboard | Arpeggio |
| 0 | 0 | 0 | $C_3$ | $C_2$ | $C_1$ | |
| 0 | 0 | 1 | $C_3\# \sim C_4$ | $C_2\# \sim C_3$ | $C_1\# \sim C_2$ | $C_2\# \sim C_3$ |
| 0 | 1 | 0 | $C_4\# \sim C_5$ | $C_3\# \sim C_4$ | $C_2\# \sim C_3$ | $C_3\# \sim C_4$ |
| 0 | 1 | 1 | $C_5\# \sim C_6$ | $C_4\# \sim C_5$ | | $C_4\# \sim C_5$ |
| 1 | 0 | 0 | $C_6\# \sim C_7$ | $C_5\# \sim C_6$ | | $C_5\# \sim C_6$ |

As is clear from Table 2, the relationships between block codes $B_1$–$B_3$ and octave ranges are different from one another separately according to the kinds of keyboard. For instance, the key range of the upper keyboard is from note $C_3$ to note $C_7$, that is, notes lower in tone pitch than note $C_3$ (exclusive) (notes lower than note $B_2$ (inclusive)) and note higher in tone pitch than note $C_7$(exclusive) (note higher than note $C_7$# (inclusive)) are not used, and even with the same block code $B_1$–$B_3$ the octave range of the upper keyboard is different by one octave from that of the lower keyboard. In addition, the octave range to which one and the same block code $B_1$–$B_3$ is not an ordinary range of from note C to note B, but a range of from note C# to note C on the higher tone side. Accordingly, the block code $B_1$–$B_3$ "0 0 0" in the lowest range is applied only to one tone C which is the lowest. Indicated in the column "Arpeggio" in Table 2 are tone range corresponding to the contents of the block code $AB_1$, $AB_2$ included in a key code $AN_1$–$AB_2$ for automatic arpeggio tone which is provided by the automatic arpeggio circuit 23 (FIG. 1). The tone ranges are substantially equal to those for the block codes $B_1$–$B_3$ for the lower keyboard; however, it should be noted that note $C_2$ in the lowest tone range is not used in the automatic arpeggio. Accordingly, with respect to the block code $AB_1$, $AB_2$ for arpeggio, a bit corresponding the third bit $B_3$ is not required. The key range of the pedal keyboard is from note $C_1$ to note $C_3$, and therefore in this case also the data of the third bit $B_3$ is unnecessary.

Keyboard signals U, L, and P representative of keyboards to which keys represented by key codes $N_1$–$B_3$ belong are outputted by the key coder 11 in synchronization with the key codes $N_1$–$B_3$ and with a time width of 48 μs. The signals U, L and P represent the upper keyboard, the lower keyboard and the pedal keyboard, respectively.

A depressed key's key code $N_1$–$B_3$ and its keyboard signal U, L or P are provided by the key coder 11 repeatedly at suitable time intervals. Upon release of the key, provision of the key code $N_1$–$B_3$ is suspended. In order to detect what key code concerns the released key among the key codes which have been provided, the key coder 11 periodically generates a key-off detecting signal X. The generation timing of the key-off detecting signal X is 48 μs equal to one key code delivery time indicated in the part (k) of FIG. 3. While this key-off detecting signal X is being produced, none of the key code $N_1$–$B_3$ and the keyboard signals U, L and P are produced. The generation interval of the key-off detecting signal X is of the order of 5 ms for instance. It is a relatively long period of time for a digital system, but it is so short for a person's hearing sense that he cannot distinguish two successively produced key-off detecting signals X. The assignment control section 19 in the tone production assignment circuit section 13, under the conditions that no key code $N_1$–$B_3$ is supplied to the channel processor 12 during one generation interval of key-off detecting signal X although it has been supplied to the channel processor 12, determines that the key concerning the key code $N_1$–$B_3$ has been released.

In this example, the key coder 11 is so designed that it delivers not only information ($N_1$–$B_3$, U, L, P and X) concerning keys as was described above but also data selected by switches employed for musical tone control or function selection. When automatic arpeggio performance is selected, the key coder 11 outputs an automatic arpeggio selection signal ARP with a time width of 48 μs synchronous with one key code delivery time shown in the part (k) of FIG. 3. Furthermore, the key coder 11 is so designed that when the automatic arpeggio selection signal ARP is outputted, pieces of information ($N_1$–$B_3$, U, L P and X) concerning keys are not outputted thereby. The key coder 11 outputs an envelope control signal EC. This signal EC is to change a produced tone's amplitude envelope waveform over to either a sustain tone system envelope waveform or an attack system envelope waveform, and has a DC "1" level or a DC "0" level according to the set positions of an envelope control switch [(not shown)] $S_{EC}$ (*FIG. 1*). A damper signal DU outputted by the key coder is to abruptly eliminate a musical tone envelope waveform which remains as a decayed waveform even after key release, and has a DC "1" level or a DC "0" level according to the on-off operation of a damper switch [(not shown)] $S_{DU}$ (*FIG. 1*). *Thus the key coder 11 includes means for generating envelope information (e.g., the signals EC and DU) to determine the envelope characteristics of a tone.*

Furthermore, the key coder 11 is so designed that process for automatic bass chord performance can be effected. That is, in the case where a automatic bass chord performance is selected, an automatic bass's key code $N_1$–$B_3$ and an automatic chord's key code $N_1$–$B_3$ are provided with suitable timing in accordance with keys depressed in the keyboard section 10. In an automatic bass chord performance, an automatic bass chord selection signal ABC is outputted, in a direct current mode, by the key coder 11. A slow rock selection signal SR has a DC "1" level when a slow rock rhythm is selected. A chord timing signal CG is outputted by the key coder 11 with the timing of producing an automatic chord. These signals ABC, SR and CG are applied through the channel processor 12 to the digital tone generator, where they are used to control an automatic chord's amplitude envelope waveform.

In the "automatic bass chord performance", in general, keys in the keyboard section are depressed in chord form, a chord name is detected from the combination of the keys thus depressed, tones corresponding to the root (fundamental note) and sub-notes of the chord are automatically produced as bass tones in accordance with a bass pattern, and chord forming tones are produced automatically with chord tone producing timing. A bass automatically formed in supplied, as a pedal keyboard key code, to the channel processor 12, while a chord is supplied, as a lower keyboard key code, to the channel processor 12. In the electronic musical instrument relating to this embodiment a device disclosed in the specification entitled as "Musical Instrument with Automatic Bass Chord performance Device" of U.S. patent application Ser. No. 825,443 filed Aug. 17, 1977 and assigned to the same assignee as the present case, can be employed for automatic bass chord performance. Such an "automatic bass chord performance control device" is provided on the output side of the key coder 11, that is, it is provided between the key coder 11 and the channel processor 12. However, it should be noted that the "automatic bass chord performance control device" is included in the key coder 11 in FIG. 1. In fact, it is possible that by following the teaching of the U.S. patent application Ser. No. 825,443 an automatic bass chord performance function can be incorporated in the key coder 11 to commonly use the circuits. Accordingly, this embodiment may employ an arrangement in which an automatic bass chord performance function is positively incorporated in the key coder 11, or it may employ an arrangement in which an original key coder part and an automatic bass chord performance control part are segregated from each other in the key coder 11 which is illustrated as one block for convenience in description. The detailed description of the automatic bass chord performance control will be omitted.

In addition, the key coder 11 outputs a memory signal MM representative of the fact that information representative of a key depressed should be stored even after the release of the key so as to be used for musical tone production, an up/turn selection signal UT for selecting an automatic arpeggio tone's tone pitch increment pattern or increment and decrement repetition pattern, and arpeggio pattern selection signals $AP_1$, $AP_2$, $AP_3$ and $AP_4$ when required; however, their detailed descriptions will be omitted.

Figure 5:
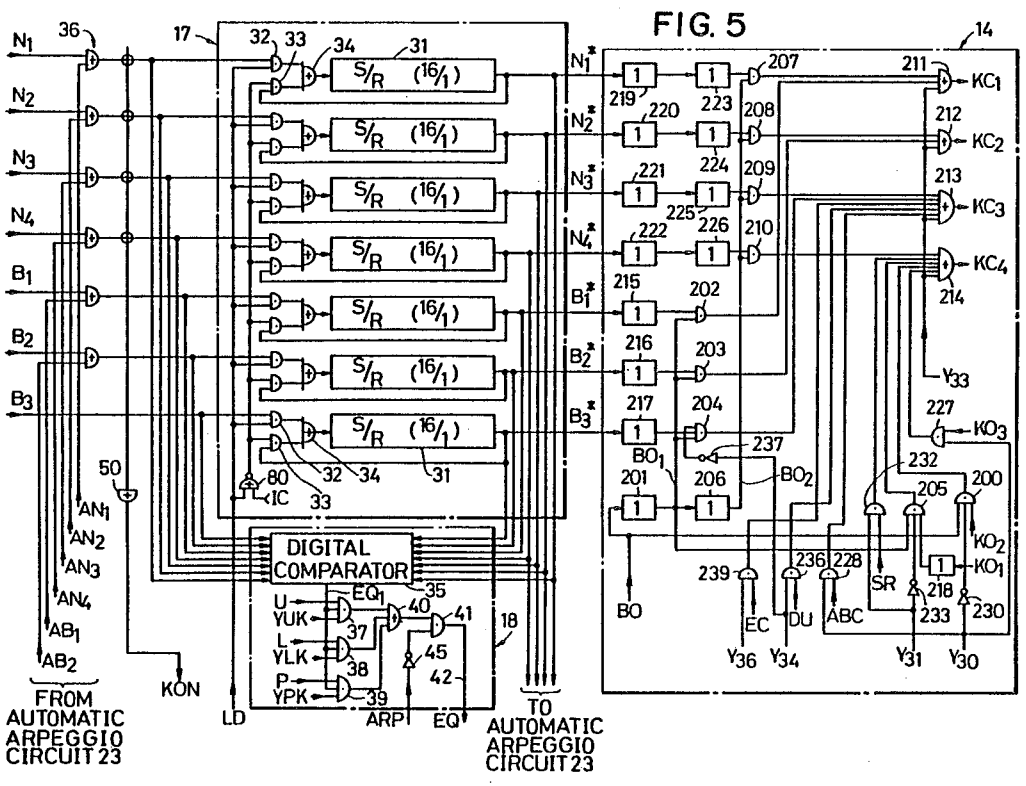
FIG. 5 is a detailed block diagram illustrating a key code memory circuit, a key code comparison circuit and a data multiplex circuit shown in FIG. 1.

(4) Description of the Tone Production Assigning Circuit Section 13:

One example of the tone production assignment circuit 13 will be described in detail. Referring to FIG. 5, the key code memory circuit 17 comprises a 16-stage/1-bit shift register 31, a data inputting AND circuit 32, a self-holding AND circuit 33 and an OR circuit 34 for supplying input data to the first stage of the shift register 31 for each bit of the key code $N_1$–$B_3$. Each shift register 31 carries out its shifting operation every 1 $\mu$s in accordance with the main clock pulse $\phi_1$. The number of stages in the shift register 31 corresponds to the number of tone production channels. The key codes $N_1^*$–$B_3^*$ of tones assigned to the respective channels are stored in time division manner in the stages of the shift registers 31. These key codes $N_1^*$–$B_3^*$ are successively outputted by the key code memory circuit 17 in synchronization with the respective channel times, each having 1 $\mu$s as indicated in the part (a) of FIG. 3, and are applied to the one input side of a digital comparator 35 in a key code comparison circuit 18, to the other input side of which the key code $N_1$–$B_3$ having a time width of 48 $\mu$s delivered from the key coder 11 is applied through a group of OR circuits 36.

Figure 6:
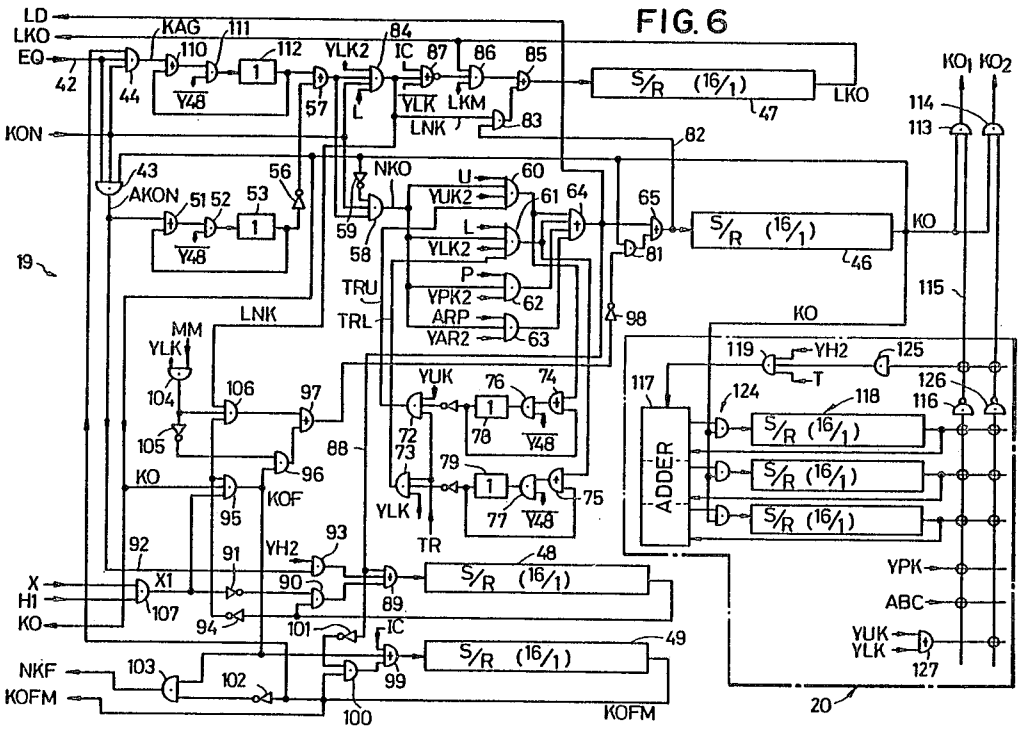
FIG. 6 is a block diagram illustrating an assignment control circuit and an attack system key-on signal generating circuit shown in FIG. 1, in detail.

In the digital comparator 35, the key code $N_1$–$B_3$ of a depressed key which is not changed for 48 $\mu$s is compared with the key code $N_1^*$–$B_3$ which is changed every 1 $\mu$s and has been assigned already. In the case where the same key code $N_1$–$B_3$ as the key code $N_1$–$B_3$ has been stored in the memory circuit 17, the coincidence detection signal $EQ_1$ is raised to a logical level "1" (hereinafter referred to as "1" when applicable) in synchronization with the channel time thereof. In the digital comparator 35, the comparison is carried out independently of the keyboard of the key code $N_1$–$B_3$, and the coincidence detection signal $EQ_1$ is produced. The coincidence detection signal $EQ_1$ is applied to AND circuit 37, 38 and 39, whereby only the coincidence detection signal $EQ_1$ which is provided in the channel time of the same keyboard as a keyboard to which a key code $N_1$–$B_3$ supplied from the key coder 11 belongs is selected. For this purpose, the upper keyboard signal U or the lower keyboard signal L or the pedal keyboard signal P delivered from the key coder 11 in synchronization with a key code $N_1$–$B_3$ is applied to the AND circuit 37 or 38 or 39, respectively. A key code $N_1^*$–$B_3$ is assigned to the special channel for the respective keyboard, and therefore the signals YUK, YLK and YPK representative of the special channels of the keyboards, as indicated in the parts (b), (c) and (d) of FIG. 3 are applied to the AND circuits 37, 38 and 39. The outputs of the AND circuits 37, 38 and 39 are applied to an OR circuit 40, the output of which is applied, as a comparison output EQ, through an AND circuit 41 and a line 42 to AND circuits 43 and 44 in the assignment control section 19 (FIG. 6). The AND circuit 41 is to suspend the application of the comparison output EQ to the assignment control circuit 19 while the automatic arpeggio selection signal ARP is supplied thereto. In this case, the signal ARP is applied through an inverter 45 to the AND circuit 41 to disable the latter 41. As was described before, while the automatic arpeggio selection signal ARP is being provided, none of the keyboard signals U, L and P are provided. Therefore, the output of the OR circuit may be introduced to the line 42 without providing the AND circuit 41. For the period of 48 $\mu$s during which the automatic arpeggio selection signal ARP is outputted, the key code $AN_1$–$AB_2$ of an automatic arpeggio tone is applied to the OR circuits 36 by the automatic arpeggio circuit 23 (FIG. 1) and is stored in the key code memory circuit 17 with the timing corresponding to the fourteenth channel which is the arpeggio special channel. The note code $N_1^*$–$N_4^*$ of the output of the key code memory circuit 17 is supplied to the automatic arpeggio circuit 23 (FIG. 1).

Referring to FIG. 6, the assignment control section 19 comprises a key-on memory 46, a lower keyboard key-on memory 47, a key-on temporary memory, a key-off memory 49, and a circuit for controlling the data inputting operations and storage cancelling operations of these memories. Each of the memories 46 through 49 has a 16-stage/1-bit shift register so as to store the data of the channels in time division manner. When a key concerning a key code $N_1^*$–$B_3^*$ which has been assigned and stored in the key code memory circuit 17 is being depressed, a signal "1" (key-on signal KO) is stored by the key-on memory 46 in synchronization with the relevant assigned channel. Accordingly, this indicates that tone assignment has already been done to the channel for which the output of the key-on memory is at "1", and the key of the tone is being depressed. *Thus the key code memory circuit 17 and the key-on memory 46 together comprise a memory means or assignment memory means storing for each assigned channel both a key code and the associated key depression state data.* The aforementioned comparison output EQ, the output KO of the key-on memory 46 and a key code detecting signal KON from an OR circuit 50 (FIG. 5) are applied to the AND circuit 43. A note code $N_1$–$N_4$ supplied by the key coder 11 (or the note code $AN_1$–$AN_4$ of an automatic arpeggio) is inputted to the 4-input OR circuit 50. Accordingly, when any key code $N_1$–$B_3$ is supplied to the key code memory circuit 17, the key code detection signal KON is raised to "1".

Accordingly, the AND circuit 43 outputs a signal "1", when the following three conditions are satisfied:

(1) At present, a key code $N_1$–$B_3$ (or $AN_1$–$AB_2$) is supplied (KON="1").

(2) The key code $N_1$–$B_3$ has already been assigned to a channel. (EQ="1").

(3) The tone assigned to the channel is of a key being depressed, (the output of the key-on memory 46 being at "1"). This output "1" of the AND circuit 43 will be referred to as "an assigned key-on signal AKON" when applicable. The signal AKON is applied through an OR circuit 51 and an AND circuit 52 to a delay flip-flop 53, where it is stored. This storage is self-maintained through the OR circuit 51 and the AND circuit 52. A signal $\overline{Y48}$ applied to the other input terminal of the is obtained by inverting a one cycle finish signal Y48 (the part (1) of FIG. 3). More specifically, the one cycle finish signal $\overline{Y48}$ is provided by an AND circuit 54 in the timing signal generating circuit 15 (FIG. 4). The third process period signal H3 from the decoder 30 (the part (h) of FIG. 3) and a pulse synchronous with the 16th channel time from the AND circuit 25 are applied to the AND circuit 54, and the one cycle finish signal Y48 is provided in the last channel time of the process operation cycle as indicated in the part (1) of FIG. 3. Since the signal $\overline{Y48}$ is obtained by inverting the output of the AND circuit 54 by means of an inverter 55, it is maintained at "1" for the period of 47 bit-times covering the first and second process periods (H1 and H2) plus the period from the beginning of the third process period (H3) to the 15th bit-time thereof (cf. the part (m) of FIG. 3). The AND circuit 52 (FIG. 6) enabled by the signal $\overline{Y48}$ is disabled with the generation timing of the one cycle finish signal Y48. Therefore, the self-holding of the delay flip-flop 53 is cleared at the last channel time of the third process period (H3).

In the case where a key code $N_1$–$B_3$ supplied by the key coder 11 is one which has been assigned already, an assigned key-on signal AKON is provided in a relevant assigned channel time of the 16 bit-times during which the first process period signal H1 is outputted. Since this signal AKON is immediately stored in the delay flip-flop 53, the output of the delay flip-flop 53 is maintained at "1" for the period of 16 bit-time during which the second process period signal H2 is ouputted. This output "1" of the delay flip-flop 53 is applied to an inverter 56, where it's level is switched to a logical "0" level (hereinafter referred to merely as "0" when applicable), as a result of which no new assignment in the second process period (H2) is effected.

In contrast, in the case where a key code $N_1$–$B_3$ supplied by the key coder 11 has not been assigned yet (or in the case where an automatic arpeggio key code ($AN_1$–$AB_2$ is supplied), the output of the AND circuit 43 is always at "0" while the first and second process period signals H1 and H2 are outputted. Accordingly, no signal "1" is stored in the delay flip-flop 53, and the output of the flip-flop 53 is maintained at "0". In this case, while the second process period signal H2 is provided, the output of the inverter 56 is at "1" without fail. This output "1" of the inverter 56 is applied through an OR circuit 57 to an AND circuit 58, as a result of which a new key-on signal NKO is provided which indicates the fact that a key is newly depressed. A key code detection signal KON is applied to the AND circuit 58 by the OR circuit 50 in FIG. 5. When the output of the inverter 56 is at "1" and this key code detection signal KON is at "1" also, it means that a new key code $N_1$–$B_3$ which is not assigned yet is supplied. Such a new key code $N_1$–$B_3$ should be assigned to any of the channels. For this purpose, the output of the key-on memory 46 is applied through an inverter 57 to the AND circuit 58, thereby to enable the AND circuit 58 in a channel time during which key release is effected, and to provide the new key-on signal NKO in that channel time.

The new key-on signal NKO outputted by the AND circuit 58 is applied to AND circuits 60, 61, 62 and 63, and it is selected by one of the AND circuits 60 through 63 in synchronization with a single channel time. The new key-on signal NKO thus selected is applied through OR circuits 64 and 65 to the key-on memory 46, where it is stored. The output "1" of the OR circuit 64 becomes a load signal LD. The upper keyboard signal U, the lower keyboard signal L, the pedal keyboard signal P and the automatic arpeggio selection signal ARP are applied to the AND circuits 60 through 63 by the key coder 11, respectively, as a result of which one of the AND circuits 60 through 73, which corresponds to the keyboards (or function) to which the key code $N_1$–$B_3$ being supplied belongs, is enabled. Signals YUK2, YLK2, YPK2 and YAR2 representative of the keyboards and automatic arpeggio exclusive assignment channels are applied to the AND circuits 60 through 63, respectively. These signals YUK2, YLK2, YPK2 and YAR2 are the exclusive channel signals YUK, YLK, YPK and YAR (the parts (b) through (e) of FIG. 3) which occur during the second process period indicated in the part (g) of FIG. 3, and these signals are provided by AND circuits 66 through 69 in FIG. 4. The second process period signal H2 is applied to one input terminal of each of the AND circuits 66 through 69 by the decoder 30, while the upper keyboard exclusive channel signal YUK, the lower keyboard exclusive channel signal YLK, the pedal keyboard exclusive channel signal YPK and the automatic arpeggio exclusive channel signal YAR are applied to the remaining input terminals of the AND circuits 66 through 69 by the OR circuits 27, 28, 70 and 71, respectively. Thus, the signals YUK2, YLK2, YPK2 and YAR2 are provided in the exclusive channel times of the second process period, respectively.

Each of the exclusive channels of the pedal keyboard tone and the automatic arpeggio tone is one channel.

Therefore, if the new key-on signal NKO is provided while the pedal keyboard signal P or the automatic arpeggio selection signal is being supplied, the AND circuit 62 or 63 outputs a signal "1" in the first or fourteenth channel time of the second process period in response to the signal YPK2 or YAR2. Each of the upper keyboard tone and the lower keyboard tone has seven channels as its exclusive channel. Therefore, in order to assign the new key-on signal NKO to a single channel, a truncate channel designation signal TR is employed. The signal TR is outputted by the truncate circuit 21 (FIG. 7) as described later. The truncate channel designation signal TR is provided in synchronization with the assignment channel time of the key which has been released earliest in the upper keyboard and the assignment channel time of the key which has been released earliest in the lower keyboard, with respect to the tones being subjected to assignment. The signal TR thus provided is applied to AND circuits 72 and 73, where it is divided into an upper keyboard truncate channel designation signal TRU and a lower keyboard truncate channel designation signal TRL separately according to the upper keyboard exclusive channel signal YUK and the lower keyboard exclusive channel signal YLK. The signals TRU and TRL are applied to the AND circuits 60 and 61, respectively, whereby the new key-on signal NKO is selected in a single channel time of a relevant keyboard. When a signal "1" is outputted by the AND circuit 60 or 61 once, the signal "1" is applied through an OR circuit 74 or 75 and an AND circuit 76 or 76 to a delay flip-flop 78 or 79, where it is stored. This storage is self-held by the signal Y48 applied to the AND circuit 76 or 76 until the one cycle finish signal Y48 is provided. The output "1" of the delay flip-flop 78 or 79 is applied through an inverter to the AND circuit 72 or 73 to disable the latter. Accordingly, even if the truncate channel designation signal TR is provided twice or more in different channels relating to one and the same keyboard, the truncate channel designation signal TRU or TRL of the upper keyboard or the lower keyboard is generated only once in the second process period (the part (g) of FIG. 3).

When any of the AND circuits 60 through 63 provides the output "1", a new assignment is carried out. More specifically, The signal "1" outputted by any of the AND circuits 60 through 63 in a single channel time of the second process period is applied, as a load signal LD, through an OR circuit 64 to the key code memory circuit 17 (FIG. 5). Referring to FIG. 5, the load signal LD enables data inputting AND circuits 32 provided respectively for the bits in the key code memory circuit 17. The load signal LD is further applied through a NOR circuit 80 to self-holding AND circuits 33 to disable the latter. Therefore, the stored key code $N_1^*$-$B_3^*$ of a channel for which the load signal LD is provided is cleared, and a new key code $N_1$-$B_3$ (or $AN_1$-$AB_2$) is stored in the key code memory circuit 17 in synchronization with the relevant channel time.

Referring back to FIG. 6, the output "1" of the OR circuit 64 is applied through an OR circuit 65 to the key-on memory 46, whereby the key-on signal KO is stored in synchronization with the storage of the new key code $N_1$-$B_3$ in the key code memory circuit 17. The output KO of the key-on memory 46 is self-held by means of the OR circuit 65 and an AND circuit 81. The AND circuit 81 is disabled in the time of the channel to which a key code $N_1^*$-$B_3^*$ relating to key release has been assigned, as described later.

The output of the OR circuit 65 is applied through a line 82 to an AND circuit 83. Accordingly, when a signal "1" representative of a key being depressed is inputted to the key-on memory 46, the AND circuit 83 is disabled. Applied to the other input terminal of the AND circuit 83 is a lower keyboard new key-on signal LNK representing the fact that a key is newly depressed in the lower keyboard. The aforementioned output of the OR circuit 57 and the key code detection signal KON are applied to an AND circuit 84, and the lower keyboard signal L and the lower keyboard exclusive channel signal YLK 2 in the second process period are applied to the remaining input terminals of the AND circuit 84. Accordingly, if a key is depressed in the lower keyboard, at the beginning of the depression the output LNK of the AND circuit 84 is raised to "1" only once in synchronization with the lower keyboard exclusive channel time of the second process period. In this operation, the OR circuit 65 outputs a signal "1" in synchronization with the assignment channel of the tone of a key being depressed in the lower keyboard. Therefore, the output of the AND circuit 83 is raised to "1" in synchronization with the assignment channel of the tone of the key being depressed in the lower keyboard. This output "1" is applied through an OR circuit 85 to the lower keyboard key-on memory 47 where it is stored. This storage in the memory 47 is self-held by means of the AND circuit 86 and the OR circuit 85. The output of the NOR circuit 87 is applied to the AND circuit 86. The AND circuit is disabled when the initial clear signal Ic is provided, in channel times other than the lower keyboard exclusive channel (the signal $\overline{YLK}$ being at "1") or when the AND circuit 84 provides the lower keyboard new key-on signal LNK. Applied through a line 166 to the other input terminal of the AND circuit 86 is a lower keyboard key depression memory signal LKM whose level is maintained raised to "1" when a key is depressed in the lower keyboard. Therefore, when a key is depressed in the lower keyboard, the self-holding of the lower keyboard key-on memory 47 is permitted. A lower keyboard key-on signal LKO is outputted by the lower keyboard key-on memory 47 in time division manner in synchronization with the channel time to which the tone of a key being depressed in the lower keyboard is assigned. This signal LKO is utilized in the automatic arpeggio circuit 23 (FIG. 1); however, its detailed description will be omitted.

(KEY-OFF DETECTION)

The load signal LD representing a channel to which a newly depressed key is to be assigned is applied from the OR circuit 64 through a line 88 (FIG. 6) to an OR circuit 89, and it is stored in the key-on temporary memory 48. The key-on temporary memory 48 operates in such a manner that, if a key is depressed even once in one generation period of the key-off inspection signal X, the memory 48 stores a signal "1" in the assignment channel of the key. This storage is self-held by means of an AND circuit 90. Upon application of the key-off inspection signal X by the key coder 11, the AND circuit 90 is disabled. Accordingly, whenever the key-off inspection signal X is supplied, the storage in the key-on temporary memory 48 is cleared. The key-off inspection signal X is applied to an AND circuit in FIG. 6, and it is selected only for the first process period (the part (f) of FIG. 3) with the aid of the signal H1. A key-off inspection signal X1 selected in synchronization with the first process period is applied through an inverter 91 to the AND circuit 91, as a result of which the AND circuit 90 is disabled only for the first process period. During this period, the contents stored in all the channels in the key-on temporary memory 48 are cleared.

In the case where a key code $N_1$–$B_3$ (or $AN_1$–$AB_2$) based on the depression of a new key which is not subjected to assignment is supplied, the aforementioned load signal LD is applied through the line 88 and the OR circuit 89 to the key-on temporary memory 48, and a signal "1" is stored in the memory 48 in synchronization with the channel time to which the relevant key code $N_1$–$B_3$ (or $AN_1$–$AB_2$) has been assigned. If, in the case where an already assigned key is depressed, the key code $N_1$–$B_3$ of that key is supplied, an assigned key-on signal AKON is provided by an AND circuit (FIG. 6) in synchronization with that assignment channel and it is applied through a line 92 to an AND circuit 93. A second process period synchronization signal YH2 is applied to the other input terminal of the AND circuit 93. Therefore, the assigned key-on signal AKON passes through the AND circuit 93 only for the second process period, and it is applied through an OR circuit 89 to the key-on temporary memory 48, where it is stored. Accordingly, the storage in the key-on temporary memory 48 is cleared by the key-off inspection signal X once; however, as long as the key is depressed, a signal "1" is stored in that key's assignment channel before the next key-off inspection signal X is supplied. The second process period synchronization signal YH2 mentioned above is supplied by an AND circuit 108 in FIG. 4., and it is produced in accordance with the AND logic of the output of an OR circuit (FIG. 4) receiving the outputs of the sixteen stages in the shift register (FIG. 4) and the second process period H2 of the decoder 30 (FIG. 4). Accordingly, the signal YH2 is correctly in synchronization with the first through sixteenth channel times in the second process period.

The key-off inspection signal X generation period is of the order of 5 ms. If the key code $N_1$–$B_3$ of the key which was depressed is not supplied by the key coder 11 during one generation period of the signal X at all, it is determined that the key has been released. This determination is carried out by an AND circuit 95. That is, it can be determined as follows: Key depression is being effected for the channel for which a signal "1" is stored in the key-on temporary memory 48 immmediately before the key-off inspection signal X is supplied, and key release has been effected for the channel for which a signal "0" is stored therein. Thus, the output of the key-on temporary memory 48 is applied through an inverter 94 to the AND circuit 95, thereby to disable the latter 95 during the channel time for which the key release is effected. A key-off inspection signal X1 having a 16-bit time width in synchronization with the first process period is applied to the AND circuit 95 from an AND circuit 107. Furthermore, the key-on signal KO outputted by the key-on memory 46 is also applied to the AND circuit 95 in order to detect whether or not a key has been depressed in the channel for which the memory content is "0" in the key-on temporary memory 48. Therefore, only when the key which has been depressed is released, that is, key release is effected, the AND condition of the AND circuit 95 is satisfied in the assignment channel time of that key. The output "1" of this AND circuit 95 is a key-off signal KOF.

The key-off signal KOF is applied through an AND circuit 96 an OR circuit 97 to an inverter 98, thereby to disable the self-holding AND circuit 81 of the key-on memory 46. As a result, the key-on signal KO stored in the key-on memory 46 is cleared in correspondence to the channel for which the key-off signal KOF is provided. Accordingly, the key-on signal KO is stored in the key-on memory 46 only for the period during which a key is being depressed. Since the key code memory circuit 17 is not cleared by the key-off signal KOF, the relevant channel assignment is maintained even after the key release, and the key code $N_1$*–$B_3$* concerning the key released is remains stored.

The key-off signal KOF is applied through an OR circuit 99 to the key-off memory 49. This key off memory 99 operates to stored a signal "1" in synchronization with the assignment channel time of a key which has been released among keys which are being assigned to the channels. A key-off memory signal KOFM outputted by the last state therein is self-held by means of an AND circuit 100 and the OR circuit 99. Applied to the other input terminal of the AND circuit 100 is the output of the OR circuit 64 which are delivered through the line 88 and inverter 101. Therefore, if the load signal LD is provided during a channel time and a new assignment is effect, the storeage in that channel of the key-off memory 49 is cleared. The key-off memory signal KOFM is applied through an inverter 102 to one input terminal of an AND circuit 103, to the other input terminal of which the key-off signal KOF is applied. When the key-off signal KOF is provided in a channel for the first time, the storage in that channel of the key-off memory 49 is "0". The output of the inverter 102 to which the signal KOFM is applied is "1" and therefore the output of the AND circuit 103 has "1". This output "1" of the AND circuit 103 is utilized in the circuit shown in FIG. 7 as a new key-off signal NKF representative of the fact that key release has effected The new key-off signal NKF is produced only once in the channel time to which the relevant key has been assigned, at the beginning of the key release.

The AND circuit, to which the key-off signal KOF is applied, is normally enabled; however, when "a memory function" is effected, it is enabled during the lower keyboard exclusive channel time. Upon operation of a switch (not shown) for performing the memory function, a memory signal MM is provided by the key coder 11 and it is applied to one input terminal of an AND circuit 104, to the other input terminal of which the lower keyboard exclusive channel signal YLK is applied. The output of the AND circuit 104 is applied through an inverter 105 to the AND circuit 96. Accordingly, where the "memory function" is performed, the AND circuit 96 is disabled during the lower keyboard exclusive channel times (cf. the part (c) of FIG. 3). Even if the key-off signal KOF is produced in these channel times, the self-holding AND circuit 81 of the key-on memory 46 is not disabled. Accordingly, in practice, even if a key is released in the lower keyboard, the key-on signal of the key-on memory 46 is not cleared, and it is handled as if the key in the lower keyboard were continuously depressed. Thus, the tone concerning the key is produced even after it is released. The above-described "memory function" is advantageous in improving the automatic performance effect. Furthermore, since the embodiment is so designed that the lower keyboard exclusive channel can be used for automatic chords, automatic chords can be produced even after key release.

The output of the AND circuit 104 is applied also to an AND circuit 106. The key-on signal KO of the key-on memory 46 which has been held even after the key release thanks of the "memory function" is cleared in correlation to the output "1" of the AND circuit 106. A signal obtained by inverting the output of the key-on temporary memory with an inverter 94 and the output of the AND circuit 84 are applied to the remaining input terminal of the AND circuit 106. The output of the inverter 94 is raised to "1" in a channel for which key release is effected. If this channel is the lower keyboard exclusive channel, then the output of the AND circuit 104 is also raised to "1". Therefore, the AND circuit 106 is disabled in the relevant channel time. If, in this case, the AND circuit 84 produces the lower keyboard new key-on signal LNK, the output of the AND circuit 106 is raised to "1". The output "1" of the AND circuit 106 is applied through the OR circuit 97 and the inverter 98 to the AND circuit 81 to disable the latter 81, as a result of which the storage of the relevant channel of the key-on memory 46 is cleared. Accordingly, the key-on signal KO held even after key release on account of the "memory function" is cleared when a key is newly depressed in the lower keyboard (or when the lower keyboard new key-on signal LNK is provided).

(KEY-ON AGAIN)

In the case where, immediately after a key is released, and the same key is depressed again, a key-on again signal KAG is outputted from the AND circuit 44, and the assignment of the key is effected to a channel different from the channel to which the key was assigned. The comparison output EQ from the key code comparison circuit 18 is applied through the line 42 to the AND circuit 44, and furthermore the key code detection signal KON representative of the supply of a key code $N_1$-$B_3$ (or $AN_1$-$AB_2$) and the output signal of the key-off memory 49 are applied to the AND circuit 44. Accordingly, under the conditions that the key code $N_1$-$B_3$ (or $AN_1$-$AB_2$) being supplied now is equal (in keyboard also) to a key code $N_1$*-$B_3$* assigned to a channel, and the storage of the key-off memory 49 in the channel to which that key code $N_1$*-$K_3$* has been assigned is "1" which has provided coincidence is released), a signal "1" is outputted by the AND circuit 44. This output "1" of the AND circuit 44 is applied, as the key-on again signal KAG representative of the fact that a key released is depressed again immediately, to the OR circuit 110, and it is further applied through as AND circuit 111 to a delay flip-flop 113 where it is stored. The output of the delay flip-flop 112 is applied to the OR circuit 57, and it is utilized for generating the new key-on signal KON.

(KEY-ON SIGNALS $KO_1$ and $KO_2$ Generation

The key-on signal KO of each channel outputted in time division manner from the last, or 16th, stage of the key-on memory 46 is applied to AND circuits 113 and 114, which in turn output the first key-on signal $KO_1$ and the second key-on signal $KO_2$, respectively, in response to the key-on signal KO. The first key-on signal $KO_1$ is a signal whose level is switched to "1" and "0" respectively according to the depression and release of a key assigned to the channel, and it is the same signal as the key-on signal KO in a normal keyboard performance. A signal from the attack system key-on signal generating circuit 20 is applied through a line 115 to the other input terminal of the AND circuit 113. The signal on the line 115 is at "1" When an ordinary performance operation is carried out by using the upper keyboard, the lower keyboard or the pedal keyboard. Therefore, the AND circuit 113 is maintained enabled at all times, and the key-on signal KO is outputted as the first key-on signal $KO_1$. Accordingly, in this case, the first key-on signal $KO_1$ is generated exactly in accordance with the depression of the key (tone) assigned to the relevant channel. The output signal of a NAND circuit 116 of the attack system key-on signal generating circuit 20 is supplied to the line 115. The automatic bass chord selection signal ABC is applied to one input terminal of the NAND circuit 116. In the case where an automatic bass chord performance is not selected, that is, in the case of an ordinary keyboard performance, the signal ABC is at "0", and the NAND circuit 116 is disabled. Therefore, the signal on the line 115 is at "1" at all times.

Where an automatic bass chord performance is selected, the first key-on signal $KO_1$ of a pedal keyboard tone is converted into a differential signal which is raised to "1" for a certain period in the beginning of the key depression. Since an automatic chord is produced in the pedal keyboard's channel in case of an automatic bass chord performance, in practice the first key-on signal $KO_1$ for an automatic bass becomes the differential signal. This can be achieved by applying the pedal keyboard exclusive channel signal YPK to the NAND circuit 116. Thus, only when the automatic bass chord selection signal ABC is supplied by the key coder 11 and only in the pedal keyboard's exclusive channel time (the first channel time), the NAND circuit 116 is enabled. Three-bit count data from a counter made up of an adder 117 comprising a 3-bit half adder and 16-stage/3-bit shift registers 118 are applied to the remaining three input terminals of the NAND circuit 116. This counter is so designed as to carry out integration count by feeding data, which is delayed by 16 channel times in the 16-stage shift registers 118, back to the adder 117, and to carry out counting operations for the channels in time division manner. A count pulse T is applied through an AND circuit 119 to the counter 117. The counter pulse T is provided by the timing signal generating circuit 15 shown in FIG. 4.

Referring to FIG. 4, the one cycle finish signal Y48 outputted by the AND circuit 54 is applied to the count input terminal of a frequency-dividing counter 120. When all of the five bits of the output of the counter 120 are raised to "1", an AND circuit 121 is operated, as a result of which a count pulse T having a time width of 48 $\mu$s is provided by means of an AND circuit 122 and an OR circuit 123. This count pulse T is obtained by subjecting the signal Y48 having a period of 48 $\mu$s to 1/32 frequency division, and therefore it has a period of about 1500 $\mu$s ($48 \times 32$). A test signal TEST applied to the OR circuit is raised to "1" in a direct current mode only when the circuit operation is checked, and accordingly is not related to the original circuit operation.

In the AND circuit in FIG. 6, the aforementioned count pulse T is selected only for the second process period, or 16 $\mu$s, with the aid of the second process period synchronization signal YH2. Accordingly, when one count pulse T is produced, one count pulse is supplied at each channel time. A group of AND circuits 124 interposed between the adder 117 and the shift registers 118 are enabled by the key-on signal from the key-on memory 46. Accordingly, where no key has been depressed in a relevant channel, the content of the relevant channel of the shift register 118 has been cleared, and counting the count pulses is effected at the time of depressing a key. When seven count pulses T are supplied after depression of a key assigned to a channel is started, the 3-bit output of the shift register 118 has "1 1 1" ("7" in decimal notation) in that channel time. If the channel time is for the pedal keyboard exclusive channel, the signal YPK is raised also to "1". If in this case the signal ABC is at "1", the NAND condition of the NAND circuit 116 is satisfied, and its output is switched to "0". When the output of the NAND circuit 116 is changed to "0", the output of the AND circuit 125 is lowered to "0", as a result of which, the AND circuit 119 is disabled. Accordingly, the count pulse T is blocked at the relevant channel time, and the memory content "1 1 1" of the shift register for the relevant channel is maintained unchanged.

The time interval which elapses from the time instant that depression of a key is started until the output of the NAND circuit 116 has "0" is about 10 ms (1.5 ms×7). For about 10 ms in the beginning of key depression, the output of the NAND circuit 116 in a channel time to which the key has been assigned is "1", and the AND circuit 113 is enabled. Accordingly, the key-on signal KO outputted by the key-on memory 46 is selected only for about 10 ms in the beginning of key depression, and it is outputted as the first key-on signal $KO_1$. Thus, in the automatic bass chord performance, the first key-on signal $KO_1$ for a tone (automatic bass) assigned to the pedal keyboard exclusive channel is provided only for about 10 ms. This short first key-on signal $KO_1$ is used for converting the amplitude envelope of an automatic bass tone (pedal keyboard tone) into an attack system envelope.

In the upper keyboard exclusive channel time, and the lower keyboard exclusive channel time, and in the pedal keyboard exclusive channel time where no automatic bass chord is effected, the output of the NAND circuit 116 is at "1" at all times. The first key-on signal $KO_1$ is produced exactly in accordance with a key depression operation (similarly as in the key-on signal KO) in these channel times. This first key-on signal $KO_1$ is used for giving a sustain system amplitude envelope to a musical tone.

The second key-on signal $KO_2$ outputted by the AND circuit 114 is employed for converting the amplitude envelopes of the upper and lower keyboard tones into attack system envelopes. The term "attack system envelope" is intended to mean an envelope waveform which is employed for producing a musical tone only for a short time period (about 10 ms for instance) in the beginning of key depression. The output signal of a NAND circuit 126 in the attack system key-on signal generating circuit 20 is applied to the other input terminal of the AND circuit 114. This NAND circuit 126 is enabled only when the upper keyboard exclusive channel signal YUK or the lower keyboard exclusive channel signal YLK is applied through an OR circuit 127 thereto. Similarly as in the above-described NAND circuit 116, the output of the shift register 118 is applied to the remaining input terminals of the NAND circuit 126. When it passes about 10 ms after depression of a key in the lower keyboard is started, or in the channel time to which the key has been assigned, the output of the shift register 118 has "1 1 1", as a result of which the NAND circuit 126 is operated, and its output is changed to "0". As a result, the AND circuit 114 is disabled in that channel time. Accordingly, the second key-on signal $KO_2$ is produced only for about 10 ms after depression of a key in the lower keyboard is started. With respect to the upper keyboard tone and the lower keyboard tone, selective use of the first and second key-on signals $KO_1$ and $KO_2$ is suitably effected in the digital tone generator section 16. The selective use of these signals $KO_1$ and $KO_2$ is controlled with the aid of an envelope control signal EC supplied from the key coder 11.

(Truncate Control)

Figure 7:
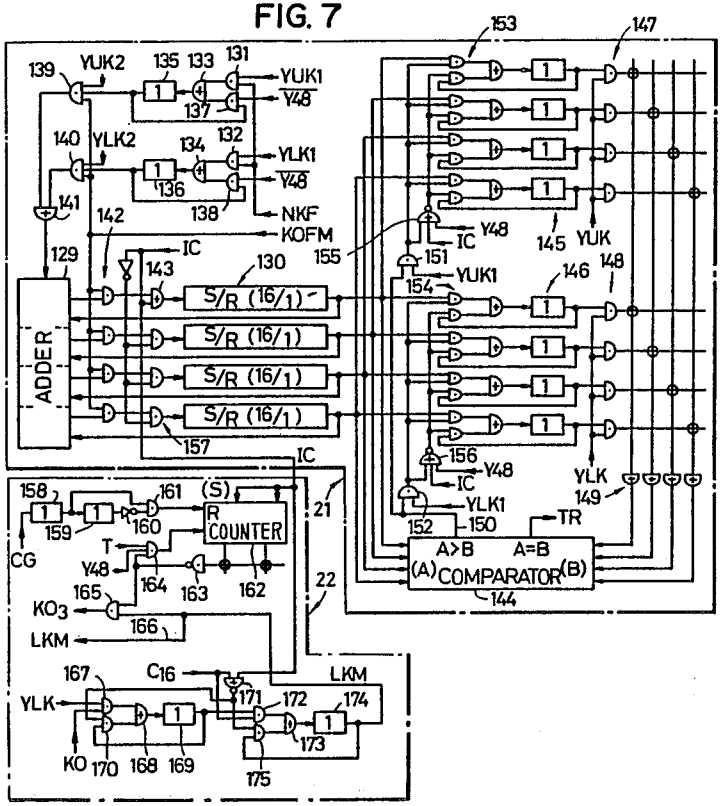
FIG. 7 is also a block diagram illustrating a truncate circuit and an automatic chord key-on signal generating circuit in FIG. 1 in detail.

The new key-off signal NKF outputted by the AND circuit 103 and the key-off memory signal KOFM outputted by the key-off memory 49 in FIG. 6 are applied to the truncate circuit 21 in FIG. 7. In the truncate circuit 21, the channel of a key which was released earliestly is detected separately in the upper keyboard exclusive channel and the lower keyboard exclusive channel, and a truncate channel designation signal TR is produced in synchronization with that channel time. A counter is made up of a 4-bit adder 129 consisting of four half adders and a 16-stage/4-bit shift register 130. If, after keys assigned to the channels are released, other keys are released, the numbers of times of release of said other keys are counted in time division manner separately according to the channels by the counter. Accordingly, it can be said that a key assigned to a channel having the maximum value in the shift register 130 is the key which was released earliestly.

When a key is released, the new key-off signal NKF is produced only once in synchronization with a channel time to which the key is assigned. Therefore, if the counter comprising the adder 129 and the shift register 130 counts the number of new key-off signals NKF, the number of times of key release can be counted. In FIG. 7, the new key-off signal NKF is applied to AND circuits 131 and 132. A first process period upper keyboard exclusive channel signal YUKI and a first process period lower keyboard exclusive channel signal YLK1 are applied to the remaining input terminals of the AND circuits 131 and 132, respectively. The signal YUK1 is provided in synchronization with the lower keyboard exclusive channel time (the part (c) of FIG. 3) in the first process period (the part (f) of FIG. 3). Accordingly, when the new key-off signal NKF is provided in the upper keyboard's channel time, the AND circuit 131 is operated. As a result, a signal "1" is inputted through an OR circuit 133 into a delay flip-flop 135. On the other hand, where the new key-off signal NKF is provided in the lower keyboard's channel time, the AND circuit 132 is operated. As a result, a signal "1" is inputted through an OR circuit 134 into a delay flip-flop 136. The storages in the delay flip-flops 135 and 136 are self-held through AND circuits 137 and 138, respectively. As the signal $\overline{Y48}$ is applied to the AND circuits 137 and 138, the self-holding is released in the last channel time in the third process period (the part (h) of FIG. 3). Thus, when a depressed key is released in the uper keyboard or the lower keyboard, the new key-off signal NKF is inputted into the delay flip-flop 135 or 136 in the first process period, and the output of the relevant delay flip-flop 135 or 136 is raised to "1" in a DC mode for the second and third process periods. The outputs of the delay flip-flops 135 and 136 are applied to AND circuits 139 and 140. A second process period upper keyboard exclusive channel signal YUK2 and a second process period lower keyboard exclusive channel signal YLK2 are applied to the AND circuits 139 and 140, respectively. Accordingly, when a key is released in the upper keyboard, the AND circuit 139 is enabled in its keyboard's exclusive channel time in the second process period. Similarly, when a key is released in the lower keyboard, the AND circuit 140 is enabled in its keyboard's exclusive channel time in the second process period. The key-off memory signal KOFM is applied to the remaining input terminals of the AND circuits 139 and 140. As the key-off memory signal KOFM is raised to "1" in synchronization with a channel time for which key release has been done already, the AND circuit 139 or 140 outputs a signal "1" only in these channel times. The outputs of the AND circuits 139 and 140 are applied through an OR circuit 141 to the least significant bit in the adder 129. The adder 129 operates to add "1" applied thereto from the OR circuit 141 to the preceding addition result with respect to a relevant channel, which is stored in the shift register 130. The result of addition of the adder 129 is applied through a group of AND circuits 142, an OR circuit 143 and AND circuit 157 to the shift register 130, where it is stored. The key-off memory signal KOFM is applied to the other input terminal of each of the AND circuits 142, and when a depressed key is assigned to a relevant channel, the signal KOFM is switched to "0", as a result of which the shift register 130 is cleared.

The output of the shift register 130 is applied to one input side (A) of a comparator 144, to the other input side (B) of which the maximum value memory data of a maximum value memory 145 or 146. Each of the maximum value memories 145 and 146 is made up of a 4-bit delay flip-flop. The maximum value memory 145 is for the upper keyboard, and its memory data is outputted through a group of AND circuits 147 in the upper keyboard exclusive channel time. The maximum value memory 146 is for the lower keyboard, and its memory data is outputted through a group of AND circuits 148 in the upper keyboard exclusive channel time. The outputs of the groups of AND circuits 147 and 148 are applied through a group of OR circuits 149 to the comparator 144. That is, the comparator 144 is used, in time division manner, commonly for the upper keyboard and the lower keyboard. When the output of the shift register 130 is greated than the memory data of the maximum value memory 145 or 146 (A > B), a signal "1" is applied to an output line 150 of the comparator 144 and it is applied to AND circuits 151 and 152, to which the first process period upper keyboard exclusive channel signal YUK1 and the first process period lower keyboard exclusive channel signal YLK1 are applied, respectively. Accordingly, where the signal "1" on the line 150 is a comparison result concerning the upper keyboard, the AND circuit 151 is operated; and where it is a comparison result concerning the lower keyboard, the AND circuit 152 is operated. The output "1" of the AND circuit 151 (152) controls the AND circuit group 153 (or 154) to clear the old storage in the maximum value memory 145 (or 146) and to input a new maximum value data supplied by the shift register 130 into the maximum value memory 145 (or 146).

Thus, the maximum value data, that is, the highest number of times of key release is stored in the maximum value memory 145 or 146 during the first process period, and it is self-held for the second and third process periods. At the last channel time of the third process period, the one cycle finish signal Y48 is produced and it is applied to NOR circuits 155 and 156. As a result, the outputs of the NOR circuits 155 and 156 are changed to "0", and the self-holding AND circuits of the AND circuit groups 153 and 154 are disabled.

The comparator 144 provides a coincidence output when the data applied to the input side (A) coincides with the data applied to the input side (B). This coincidence output is applied, as the truncate channel designation signal TR, to the AND circuits 72 and 73 in FIG. 6. In other words, when the same data as the maximum value data stored in the maximum value memory 145 or 146 is outputted by the shift register 130, the truncate channel designation signal TR is provided is synchronization with the channel time.

The initial clear signal IC provided when the power switch is turned on, is applied to the NOR circuits 155 and 156 to clear the maximum value memories 145 and 146. The initial clear signal IC is applied to the OR circuit 99 in FIG. 6 to allow all the stages of the key-off memory 49 to store "1". Therefore, immediately after the power switch is turned on, the key-off memory signals KOFM for all the channels have "1". Furthermore, the initial clear signal IC is applied through an OR circuit 143 (FIG. 7) to the least significant bit of the shift register 130, as a result of which the count value of the channels of the shift register 130 is changed to "0 0 0 1". This operation is effected in the case where a key was depressed but it has not been released yet, in order to prevent the production of the truncate channel designation signal for the channel to which the key beind depressed has been assigned. That is, in the beginning period after the power switch is turned on, the truncate channel designation signal TR is provided for the channels to which no assignment has not been effected.

(5) Description of the Automatic Chord Key-on Signal Generating Circuit 22:

When an automatic bass chord performance is selected, a chord tone production timing signal CG is supplied by the key coder 11. This signal CG is applied to a differentiation circuit comprising delay flip-flops 158 and 159, an inverter 160 and an AND circuit 161 in the automatic chord key-on signal generating circuit 22 in FIG. 7, where it is shaped into a differentiation pulse having a time width of 48 μs. This differentiation pulse from the AND circuit 161 is applied to the reset terminal of a 2-bit binary counter 162 for $\frac{1}{4}$ frequency division, to reset the content of the counter 162 to "0 0". When the output of the counter 162 has "0", the output of a NAND circuit 163 is raised to "1", thereby to enable an AND circuit 164. The count pulse T is applied through the OR circuit 123 (FIG. 4) to the other input terminal of the AND circuit 164, and this count pulse T is selected by the AND circuit 164 with the generation timing of the one cycle finish signal Y48. The output of the AND circuit 164 is applied to the count input terminal of the counter 162. When three count pulses T are provided after the counter 162 has been reset by the chord tone production timing signal, the content of the counter 162 has "1 1". As a result, the output of the NAND circuit 163 is switched to "0", and the AND circuit 164 is disabled. Accordingly, counting the count pulse T by the counter 162 is suspended. Thus, the output of the NAND circuit 163 is at "1" for about three periods of count pulse T after the generation of the chord tone production timing signal CG. This output "1" of the NAND circuit 163 is provided, as an automatic chord key-on signal $KO_3$, through an AND circuit 165. Since the count pulse T has a period of about 1500 μs, the pulse width of the key-on signal $KO_3$ is about 4.5 ms (1.5 ms × 3). The lower keyboard key depression memory signal LKM is applied to the other input terminal of the AND circuit 165. Therefore, when a key is depressed in the lower keyboard or a key code $N_1$–$B_3$ concerning a chord is periodically supplied by the key coder 11, the signal LKM is sustained at "1" to enable the AND circuit 165. This is because a chord tone is processed as a lower keyboard tone.

The lower keyboard key depression memory signal LKM can be obtained by selectively storing one, corresponding to the lower keyboard exclusive channel, of the key-on signals KO outputted in time division manner by the key-on memory 46 (FIG. 6). The lower keyboard exclusive channel signal YLK is applied to an AND circuit 167 (FIG. 7), which is enabled only at the lower keyboard exclusive channel time (the part (c) of FIG. 3). The key-on signal KO is applied to the other input terminal of the AND circuit 167, and only the key-on signals KO concerning the lower keyboard are selected by this AND circuit 167, and are applied through an OR circuit 168 to a delay flip-flop 169. The output of the delay flip-flop 169 is self-held by means of an AND circuit 170. The AND circuit 170 is disabled by the output "0" of a NOR circuit 171, to which the initial clear signal IC and a last channel signal $C_{16}$ are applied. The last channel signal $C_{16}$ is outputted by the AND circuit 25 in FIG. 4, and it is repeatedly provided in synchronization with the last channel time of the time division time slot train, that is, the sixteenth channel's time slot (the part (a) of FIG. 3). Therefore, at the sixteenth channel time at which the last channel signal $C_{16}$ is produced, the AND circuit is disabled to release the self-holding of the delay flip-flop 169.

The output of the delay flip-flop 169 is applied to an AND circuit 172 which is enabled by the aforementioned last channel signal $C_{16}$. Therefore, the storage in the delay flip-flop 169 is inputted through the AND circuit 172 and an OR circuit 173 into a delay flip-flop 174, before its self-holding is released. The output of the delay flip-flop 174 is self-hold by means of the OR circuit 173 and an AND circuit 175. The AND circuit 175 is disabled by the output "0" of the NOR circuit 171. Therefore, the self-holding of the delay flip-flop 174 is released every the sixteenth channel time at which the last channel signal $C_{16}$ is provided. If a signal "1" is provided by the delay flip-flop 169 at the time slot of the sixteenth channel, it is stored in the delay flip-flop 174 again, and the delay flip-flop 174 is self-held until the following last channel signal $C_{16}$ is provided. Thus, if a key is depressed in the lower keyboard (if a tone is assigned to the lower keyboard exclusive channel), the output of the delay flip-flop 174 is raised to "1" in a DC mode. This output "1" of the delay flip-flop 174 is utilized as the lower keyboard key depression memory signal LKM.

(6) Description of the Automatic Arpeggio Circuit 23

The automatic arpeggio circuit 23 operates in accordance with the automatic arpeggio selection signal ARP delivered from the key coder 11, so that key codes $N_1$*–$B_3$ (stored in the 2nd, 5th, 8th, 9th, 11th 12th and 15th stages of the shift register 26) corresponding to a plurality of keys depressed in a particular keyboard (for instance the lower keyboard) among the key codes $N_1$*–$B_3$* stored in the channels of the key code memory circuit 17 are selected in the order of tone pitches one at a time in accordance with the arpeggio tone production timing. The key code $N_1$*–$B_3$* thus selected is delivered, as tha automatic arpeggio key code $AN_1$–$AB_2$, to the key code memory circuit 17 during the period (48 μs) during which the automatic arpeggio selection signal ARP is provided, and it is stored in the arpeggio exclusive channel (the 14th channel) of the circuit 17. When all the stored key codes $N_1$*–$B_3$* concerning the lower keyboard are selected by the automatic arpeggio circuit 23 (when the tones of all the keys depressed in the lower keyboard are produced), the aforementioned stored key code $N_1$*–$B_3$* is carried out by the circuit 23 again. In this case, in order that the pitches of the arpeggio tones which are produced in accordance with the selected key codes $N_1$*–$B_3$* are increased (or decreased) by one octave when compared with those of the preceding tone production, the octave codes $B_1$*–$B_3$* of the key codes $N_1$*–$B_3$ are changed to deliver the arpeggio key codes $AN_1$–$AB_2$. By repeating the above-described operation, the control is effected in which arpeggio tones are repeatedly produced over a predetermined octave range one at a time at predetermined time intervals in response to the depression of a plurality of keys in the lower keyboard. A further description of this automatic arpeggio circuit 23 will be omitted.

Referring back to FIG. 7, the initial clear signal IC is applied to the set terminal (S) of the counter 162. Therefore, when the power switch is turned on, the content of the counter 162 is set to "1 1" and the output of the NAND circuit 163 is switched to "0", thereby to stop the count operation.

The detail fo the tone production assignment circuit 13 is as described above. As a result of the above-described assignment operation, the tone production of a key depressed in the upper keyboard is assigned to one of the 3rd, 4th, 6th, 7th, 10th, 13th and 16th channels; the tone production of a key depressed in the lower keyboard or an automatic chord is assigned to one of the 2nd, 5th, 8th, 9th, 11th, 12th and 15th channels; the tone production of a key depressed in the pedal keyboard or of an automatic bass is assigned to the 1st channel; and the tone production of an automatic arpeggio is assigned to the 14th channel. The key codes $N_1$*–$B_3$* of keys assigned to the respective channels are outputted in time division manner by the key code memory circuit 17 (FIG. 5) in synchronization with the respective channel times (the parts (a) through (e) of FIG. 3), and are applied to the data multiplex circuit 14. The first and second key-on signals $KO_1$ and $KO_2$ are provided in time division manner separately according to the respective channels, and are applied to the data multiplex circuit 14 from the control section 19 (FIG. 6).

(7) Description of the data Multiplex Circuit 14

In the data multiplex circuit 14 in FIG. 5, the key information such as the $N_1$*–$B_3$* and the key-on signals $KO_1$ and $KO_2$, supplied thereto in time division manner separately according to the channels from the tone production assignment circuit 13 is multiplexed, and for this purpose a multiplexing control signal BO is used. Furthermore, in the data multiplex circuit 14, timing pulses $Y_{30}$, $Y_{31}$, $Y_{33}$, $Y_{34}$ and $Y_{36}$ are employed for controlling the multiplexing of the control information, such as the evelope control signal EC, the damper signal DU, the automatic bass chord selection signal ABC and the slow rock selection signal SR supplied thereto from the key coder 11, and of the automatic chord key-on signal $KO_3$.

The multiplexing control signal BO, as indicated in the part (n) of FIG. 3, has a pulse width of 1 μs and a period of 3 μs.

As is apparent from the part (n) of FIG. 3, the signal BO occurs in synchronization with the 3rd, 6th, 9th, 12th, and 15 channel times in the first process period ($H_1$), in synchronization with the 2nd, 5th, 8th, 11th and 14th channel times in the second process period ($H_2$), and in synchronization with the 1st, 4th, 7th, 10th, 13th and 16th channel times in the third process period ($H_3$). This signal BO is provided by an OR circuit 199 in the timing signal generating circuit 15. An AND circuit 193 connected to the OR circuit 199 is enabled by the first process period signal $H_1$. The outputs of the third, sixth, ninth, twelfth and fifteenth stages of the shift register 26 are applied through an OR circuit 194 to the other input terminal of the AND circuit 193. The second process period signal $H_2$ is applied to an AND circuit 195 connected to the OR circuit 199. and the outputs of the second, fifth, eighth, eleventh and fourteenth stages of the shift register 26 are applied through an OR circuit 196 to the AND circuit 195. Furthermore, the third process period signal $H_3$ is applied to an AND circuit 197, and the outputs of the first, fourth, seventh, tenth, thirteenth and sixteenth stages of the shift register 26 are applied through an OR circuit 198 to the AND circuit 197. The outputs of these AND circuits are applied to the OR circuit 199, as a result of which the multiplexing control signal BO is outputted by the OR circuit 199. Thus, as indicated in the part (n) of FIG. 3, the multiplexing control signals BO are provided for all the channels in one process cycle.

In the data multiplex circuit 14, the pieces of key information and the pieces of control information concerning a channel are divided into three parts which are delivered out one at a time. If it is assumed that it takes one bit time (1 $\mu$s) for delivering each part of the information, then it will take three bit times (3 $\mu$s) for delivering the key information and control information concerning one channel. For this purpose, the multiplexing control signal BO generating period is 3 bit times (3 $\mu$s). In the data multiplex circuit 14, the signal BO is shifted successively by one bit time in the three bit times, so that it can be utilized in three different ways. More specifically, the signal BO is delayed successively by two delay flip-flops 201 and 206 (FIG. 5), thereby to provide a signal $BO_1$delayed by one bit time and a signal $BO_2$ delayed by two bit times. With the aid of these three signals BO, $BO_1$ and $BO_2$, the key information of one channel is divided and delivered successively. The generation timing of the three signals BO, $BO_1$ and $BO_2$ is shown enlarged in the parts (a), (b) and (c) of FIG. 8, respectively.

The original (not delayed) multiplexing control signal BO is applied to an AND circuit 200, and it is used for selecting the second key-on signal $KO_2$ which is applied to the AND circuit 200 by the AND circuit 114 in FIG. 6. The signal $BO_1$ delayed by one bit time is applied to AND circuits 202 through 205 from the delay flip-flop 201, and it is utilized to select the block code $B_1$*-$B_3$* and the first key-on signal KO. The signal $BO_2$ delayed by two bit times is applied to AND circuits 207 through 210, and it is employed to select the note code $N_1$*-$N_4$*. Thus, with the aid of these signals BO, $BO_1$ and $BO_2$, the pieces of key information $KO_2$, $B_1$*-$B_3$*, $KO_1$ and $N_1$*-$N_4$ concerning one and the same channel are selected. Therefore, after being delayed by one bit time by delay flip-flops 215, 216 and 217, the block code $B_1$*-$B_2$* outputted from the key code memory circuit 17 is applied to the AND circuit 202 through 204. After being delay by one bit time by a delay flip-flop 218, the first key-on signal $KO_1$ from the AND circuit 113 in FIG. 6 is applied to the AND circuit 205. On the other hand, the note code $N_1$*-$N_4$* from the key code memory circuit 17 is delayed by two bit times by delay flip-flop 219 through 222 and delay flip-flop 223 and 226 and is then applied to the AND circuit 207 through 210.

As a result, the key code $N_1$*-$N_4$, $B_1$*-$B_3$ outputted by the key code memory circuit 17 and the key-on signals $KO_1$ and $KO_2$ outputted by the AND circuits 113 and 114 during a channel time during which the multiplexing control signal BO is produced, are selected in the form of three parts which are shifted successively by one bit time within three bit times. The pieces of key information $N_1$*-$N_4$*, $B_1$*-$B_3$*, $KO_1$ and $KO_2$ (9-bit data in total) are applied to OR circuits 211 through 214, as a result of which a 4-bit data $KC_1$-$KC_4$ is outputted by the channel processor 12 *via parallel output transmission lines from the OR circuits 211 through 214 to the tone generator 16*. More specifically, the second key-on signal $KO_2$ selected by the AND circuit 200 with the aid of the multiplexing control signal BO is outputted as the data $KC_4$ by the OR circuit 214, the block code $B_1$*-$B_3$* and first key-on signal $KO_1$ selected by the AND circuits 202 through 204 and 205 are outputted as the data $KC_1$-$KC_4$ by the OR circuits 211 through 214, and the note code $N_1$*-$N_4$* selected by the AND circuits 207 through 210 with the aid of the signal $BO_2$ is outputted as the data $KC_1$-$KC_4$ by the OR circuits 211 through 214. The states of the output data $KC_1$-$KC_4$ of the channel processor 12 are as indicated in the part (d) of FIG. 8. The part (e) of FIG. 8 indicates the channels of the key information $N_1$*-$N_4$, $B_1$*-$B_3$, $KO_1$ and $KO_2$ outputted in the form of data $KC_1$-$KC_4$ by the channel processor 12, and its typical example is the data $KC_1$-$KC_4$ concerning the third channel. As is apparent from the above description, the time division multiplex is effected in the order of the second key-on signal $KO_2$ (the first delivery timing), the block code $B_1$*-$B_3$* and first key-on signal $KO_1$ (the second delivery timing), the note code $N_1$*-$N_4$* (the last delivery timing), in the typical example. The key information $N_1$*-$B_3$*, $KO_1$ and $KO_2$ outputted by the tone production assignment circuit section 13 when the delay multiplexing control signals $BO_1$ and $BO_2$ are provided is not used in the data multiplex circuit 14. This key information $N_1$*-$B_3$*, $KO_1$ and $KO_2$is utilized in the data circuit 14 when the multiplexing control signal BO is provided in the relevant channel time (that is, it is multiplexed to be delivered out). For example, the key information $N_1$*-$B_3$, $KO_1$ and $KO_2$ outputted by the tone production assignment circuit section 13 at the fourth and fifth channel times in the first process period ($H_1$) (cf. FIG. 3) is not utilized in the data multiplex circuit 14 as multiplex process concerning the third channel is effected in the data multiplex circuit 14 during those channel times, and in addition the AND circuits 200, 202 through 205, and 207 through 210 are not so operated that the key information $N_1$*-$B_3$*, $KO_1$ and $KO_2$ for the fourth and fifth channels is selected. However, the multiplexing control signal BO occurs at the fifth channel time of the second process period and at the fourth channel time of the third process period as indicated in the part (n) of FIG. 3, and in these cases time division multiplex process of the key information of the fourth and fifth channels is effected. The part (0) of FIG. 3 indicates the time zones during which the time division process of the key information of the channels is carried out in the data multiplex circuit 14, and the numerals indicated therein designate channels where the process is effected. For convenience in description, in FIG. 8 the time division process time zones of from the sixth channel to the eleventh channel and from the seventh channel to the sixteenth channel are omitted; however, the states of the data $KC_1$–$KC_4$ in the time division process time zones thus omitted are similar to that concerning the third channel.

In one process cycle from the first process period to the third process period, one multiplexing control signal BO is provided for each channel time. Accordingly, in one process cycle (48 μs), the time division multiplex process is carried for all the channels in the data multiplex circuit 14. Since three bit times (3 μs) is required for processing one channel, 489 bit times (48 μs) is required for processing sixteen channels. The time division process time zones of the channels shown in the part (O) of FIG. 3 are the time zones during which the key information $N_1$*–$B_3$*, $KO_1$ and $KO_2$ of the keys or musical tones which are assigned to the channels are delivered from the channel processor 12 to the digital tone generator 16. These delivery time zones are completely different from the time division channel time of the tone production assignment circuit section 13, indicated in the part (a) of FIG. 3.

At the timing of delivering the second key-on signal $KO_2$ as the data $KC_4$, the data $KC_1$–$KC_3$ are not used. Furthermore, for the pedal keyboard, the block code provided is only two bits ($B_1$*–$B_2$*, and the third bit ($B_3$*) is not provided (cf. the NAND circuit 126 in FIG. 6). Accordingly, in delivering the pieces of information assigned to the first channel which is the pedal keyboard's exclusive channel, the data $KC_1$–$KC_4$ are not used at the first delivery timing, and furthermore the data $KC_3$ (corresponding to the bit $B_3$*) is not used at the next delivery timing. For the automatic arpeggio, the third bit ($B_3$*) of its block code is not provided, and the first and second key-on signals $KC_1$ and $KC_2$ are not used. Accordingly, in delivering the pieces of information which are assigned to the fourteenth channel which is the automatic arpeggio's exclusive channel, the data $KC_1$–$KC_4$ are not used at the first timing, and the data $KC_3$ and $KC_4$ are not used at the following timing.

By utilizing the timing which is not used for the time division multiplex delivery of the pieces of information of the channels, the time division multiplex delivery of the envelope control signal EC, the damper signal DU and other control information is carried out.

The timing pulse $Y_{30}$ is used to select the automatic chord key-on signal $KO_3$ and the automatic bass chord selection signal ABC respectively with AND circuits 227 and 228 (FIG. 5). This timing pulse $Y_{30}$ is outputted by an AND circuit 229 (in FIG. 4) at the thirtieth (30th) bit time from the first channel time in the first process period (that is, at the 14th channel time in the second process period (cf. the part (p) of FIG. 3). While the timing pulse $Y_{30}$ occurs, the initial timing for time-division-multiplexing the pieces of information of the 14th channel only for the automatic arpeggio occurs in the data multiplex circuit 14. However, since the second key-on signal $KO_2$ is not used for the automatic arpeggio as was described, the time pulse $Y_{30}$ is applied to an inverter 230, the output "0" of which is applied to an AND circuit 200 to disable the latter 200. Thus, the second key-on signal $KO_2$ is not outputted from the AND circuit 200. Instead of this, AND circuits 227 and 228 are enabled by the timing pulse $Y_{30}$, as a result of which the automatic chord key-on signal $KO_3$ applied to the AND circuit 227 from an AND ciruit in FIG. 7 is selected and applied to the OR circuit 214, while the automatic bass chord selection signal ABC applied to the AND circuit is selected and applied to the OR circuit 213. As a result, the signal ABC and the key-on signal $KO_3$ are delivered, respectively as the data $KC_3$ and the data $KC_4$, at the initial time (for the pulse $Y_{30}$ generation timing) of the time division process time zone for the 14th channel (cf. the part (d) of FIG. 8).

The timing pulse $Y_{31}$ is provided through an AND circuit 231 in FIG. 4 at the next channel time of the timing pulse $Y_{30}$, or at the 15th channel time in the second process period (cf. the part (p) of FIG. 3), and it is applied to an AND circuit 232 in FIG. 5. The slow rock selection signal SR is applied to the other input terminal of the AND circuit 232. This signal SR is selected with the timing of the timing pulse $Y_{31}$ and applied to the OR circuit 214, thus being outputted as the data $KC_4$. The timing pulse $Y_{31}$ is provided at the second timing employed for delivering the data of the arpeggio exclusive channel. As was described before, in an ordinary delivery the first key-on signal $KO_1$ is delivered to the line of the data $KC_4$ at said second timing. However, since the first key-on signal $KO_1$ is not used for the automatic arpeggio, the timing pulse $Y_{31}$ is applied through an inverter 233 to an AND circuit 205 (FIG. 5) thereby to disable the AND circuit 205 adapted to select the first key-on sigal $KO_1$. Accordingly, at the generation timing of the timing pulse $Y_{31}$, the slow rock selection signal SR instead of the first key-on signal $KO_1$ is delivered as the data $KC_4$. At the second delivery timing, the block code $B_1$*–$B_3$* is delivered as the data $KC_1$–$KC_3$. However, in this connection, as the block code for automatic arpeggio is only two bits ($AB_1$, and $AB_2$), no signal is provided to the line of the data $KC_3$. Accordingly, at the second delivery timing of the data of the arpeggio exclusive channel (14th channel), the block code $B_1$*, $B_2$* is delivered as the data $KC_1$ and $KC_2$ while the slow rock selection signal SR is delivered as the data $KC_4$.

The timing pulse $Y_{33}$ is provided through an AND circuit 234 in FIG. 4 at the first channel time of the third process period ($H_3$) (cf. the part (p) of FIG. 3). In this operation, the multiplexing control signal BO is also provided (the part (h) of FIG. 3), and the first timing for delivering the data of the first channel, of the pedal keyboard's exclusive channel, occurs. However, since the second key-on signal $KO_2$ will not be used for the pedal keyboard tone, it is unnecessary to deliver the second key-on signal $KO_2$at this first timing. In view of this, the first timing in the time division process time zone concerning the pedal keyboard's exclusive channel is utilized for delivering a reference data. For this purpose, the timing pulse $Y_{33}$ is applied to the OR circuits 211 through 214 to raise the levels of the data $KC_1$–$KC_4$to "1" (cf. the part (d) of FIG. 8). The data $KC_1$–$KC_4$ whose contents are made to "1 1 1 1" as described above is the aforementioned reference data. This reference data "1 1 1 1" is utilized, as information indicating a reference timing for discriminating the location timing of various data which have been subjected to time division multiplex in the data multiplex circuit 14, in the digital tone generator section 16.

As is apparent from Table 1 and Table 2 disclosed before, it is determined that the data "1 1 1 1" is not used for the note code $N_1$–$N_4$ ($N_1$*–$N_4$*) (at least, it is not used for the storage operation of the key code memory circuit 17), and that the data "1 1 1" is not used for the block code $B_1$–$B_3$ ($B_1$*–$B_3$*). Therefore, the reference data "1 1 1 1" will never be mistaken for other key information and control information.

The timing pulse $Y_{34}$ is produced one bit time later than the production of the timing pulse $Y_{33}$ (cf. the part (p) of FIG. 3). That is, it is produced through an AND circuit in FIG. 4. This timing pulse $Y_{34}$ is applied to an AND circuit 236 in FIG. 5, as a result of which the damper signal DU applied to the other input terminal of the AND circuit 236 is selected and applied to the OR circuit 213. The timing pulse $Y_{34}$ is further applied through an inverter 237 to the AND circuit 204 to disable the latter 204. Therefore, the third bit $B_3$* of the block code is blocked, and therefore the damper signal DU is outputted as the data $KC_3$. In this case, as the block code $B_1$*–$B_3$* applied to the AND circuits 202, 203 and 204 is of the pedal keyboard, the third bit data $B_3$* is unnecessary (cf. Table 2). Accordingly, at the second timing concerning the pedal keyboard's exclusive channel (1st channel), the data $B_1$*, $B_2$*, DU and $KO_1$ are delivered as the data $KC_1$–$KC_4$ as indicated in the part (d) of FIG. 8.

The timing pulse $Y_{36}$ is outputted by an AND circuit 238 (FIG. 4) at the 4th channel time of the third process period ($H_3$) as indicated in the part (p) of FIG. 3, and it is applied to an AND circuit 239 in FIG. 5, to the other input terminal of which the envelope control signal EC is applied. The envelope control signal EC is selected with the timing of the timing signal $Y_{36}$, and is delivered, as the data $KC_3$, through the OR circuit 213. While the timing pulse $Y_{36}$ occurs, the multiplexing control signal BO occurs also (cf. FIG. 3), as a result of which the initial delivery timing of the data assigned to the 4th channel occurs. Accordingly, no key information to be delivered as the data $KC_3$ is available, and in this case the envelope control signal EC has been assigned to the relevant time slot. Thus, at the initial timing in the time division process time zone relating to the fourth channel, the signals EC and $KO_2$ are delivered as the data $KC_3$ and $KC_4$, as indicated in the part (d) of FIG. 8. *The AND circuits 236 and 239 thus comprise means for inserting commonly used envelope control information (e.g., the signals DU and EC) to certain of the output lines from the gates 211–214 at a suitable timing (FIG. 8) when the key information or key-on information is not provided on these lines.*

Figures 8, 9:
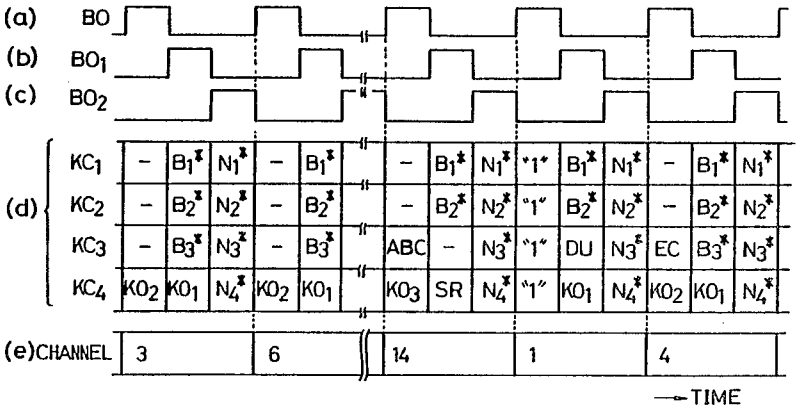
FIG. 8 is a timing chart for a description of the operation of the data multiplex circuit shown in FIG. 5.
FIG. 9 is a diagram for a description of the contents of data for every time slot with respect to data $KC_1$-$KC_4$ outputted by the data multiplex circuit shown in FIG. 5.

The pieces of information ABC, SR, DU, EC and $KO_3$ and the reference data "1 1 1 1" are delivered out only in the time division process time zones (the part (o) of FIG. 3 and the part (e) of FIG. 8) of the 14th channel (arpeggios's exclusive channel), the 1st channel (pedal keyboard's exclusive channel), and the 4th channel as indicated in FIG. 8. In the time division process time zones of the 7th, 10th, 13th and 16th channels which are executed successively thereafter, and in the time division process time zones of the 3rd, 6th, 9th, 12th, 15th 2nd, 5th, 8th and 11th channels which are further repeatedly and successively executed, only the key information $KO_2$, $B_1$*–$B_3$*, $KO_1$ and $N_1$*–$N_4$ is delivered out in time division manner, as indicated in the time zone of the 3rd channel of FIG. 8. Thus, the time division delivery of the pieces of key information and control information assigned to the channels are repeatedly carried out in the order indicated in the part (0) of FIG. 8. This repetition period is 48 μs corresponding to one process cycle.

The total number of times slots for the multiplexed data $KC_1$–$KC_4$ outputted by the data multiplex circuit 14 is fourty-eight (48). The states of the data $KC_1$–$KC_4$ at the time slots 1 through 48 are indicated in FIG. 9, with the reference data "1 1 1 1" occurring in the time slot 1.

From the above description and also from FIG. 3 and FIG. 8, the states of the data $KC_1$–$KC_4$ can be readily foreseen; however, to make sure, the data are listed in FIG. 9, in which the marks (*) of the note codes $N_1$*–$N_4$* and the block codes $B_1$*–$B_3$* are omitted for simplification. Furthermore, in FIG. 9, reference characters "U", "L", "P" and "ARP" designates channels where the tones of the upper keyboard, the lower keyboard, the pedal keyboard and the automatic arpeggio have been assigned, respectively. Although not shown in FIG. 5, the circuitry is so formed that a test signal TEST is delivered to the line of the data $KC_2$ at the same timing as that of delivering the envelope control signal EC (at the time slot 4 in FIG. 9) in the test of the circuit operation. This test signal TEST is not provided in the ordinary operation of the electronic musical instrument, and it is provided only in testing the circuit operation.

(8) Description of the Digital Tone Generator Section 16; (Analysis of the Time Division Multiplex Data in the Digital Tone Generator Section 16)

The pieces of key information and control information which are time-division-multiplexed in the form of 4-bit data $KC_1$–$KC_4$ are supplied, as the outputs of the channel processor 12, to the digital tone generator section 16 from the data multiplex circuit 14.

Figure 10:
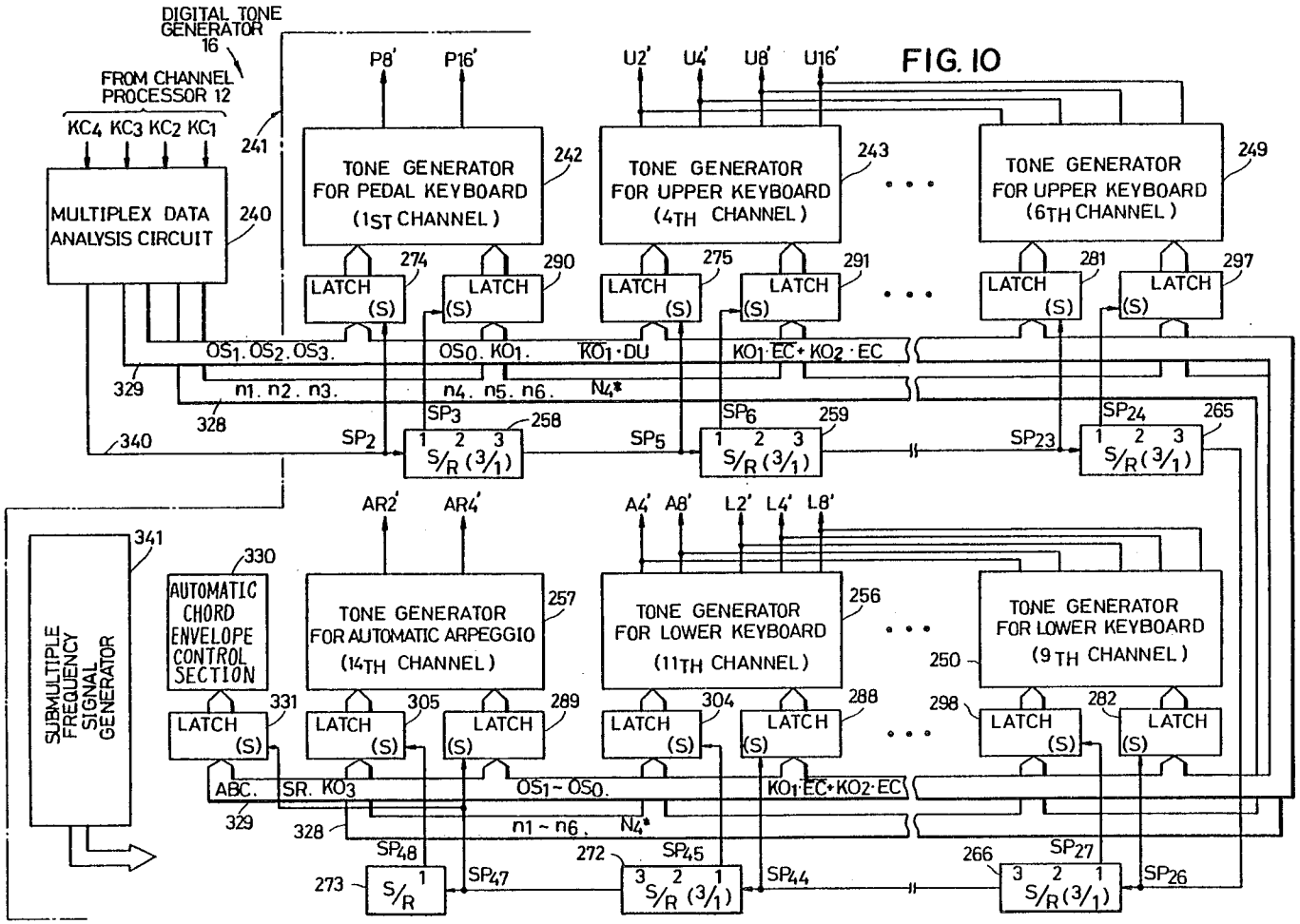
FIG. 10 is a clock diagram showing one example of a digital tone generator shown in FIG. 1.

FIG. 10 is a schematic diagram illustrating the digital tone generator section 16. A multiplex data analysis circuit 240 picks up the pieces of key information $N_1$*–$N_4$*, $B_1$*–$B_3$, $KO_1$ and $KO_2$ and the pieces of control information ABC, SR, EC, DU and $KO_3$ separately out of the data $KC_1$14 $KC_4$ delivered thereto from the data mutiplex circuit 14. In a tone generator main section 241, sixteen tone generators 242 through 257 are provided in correspondence to the channels. Furthermore, the tone generator main section 241 comprises shift registers 258 through 273 and latch circuits 274 through 289 and 290 through 305 to distribute the key information $N_1$*–$N_4$*, $B_1$*–$B_3$0, $KO_1$and $KO_2$ of the channels obtained in the multiplex data analysis circuit 240 to the tone generators 242 through 257 of the respective channels. That is, in the multiplex data analysis circuit 240, the data time-division-multiplex in the time division process time zone (3 bit times) concerning one channel are individually taken out, and as the data of each channel obtained in the multiplex data analysis circuit 240 are subjected to time-division-multiplexing, they are distributed separately according to the channels so as to be in static form by the tone generator main section 241. In order to control the timing of the analysis and distribution of the time-division-multiplexed data, the reference data "1 1 1 1" is utilized. *The multiplex data analysis circuit 240, the shift registers 258 through 273 and the latch circuits 274 through 305 thus constitute a means for demultiplexing the delivered key information $KC_1$-$KC_4$* and for supplying each demultiplexed key information to the assigned tone generator.

Figure 11:
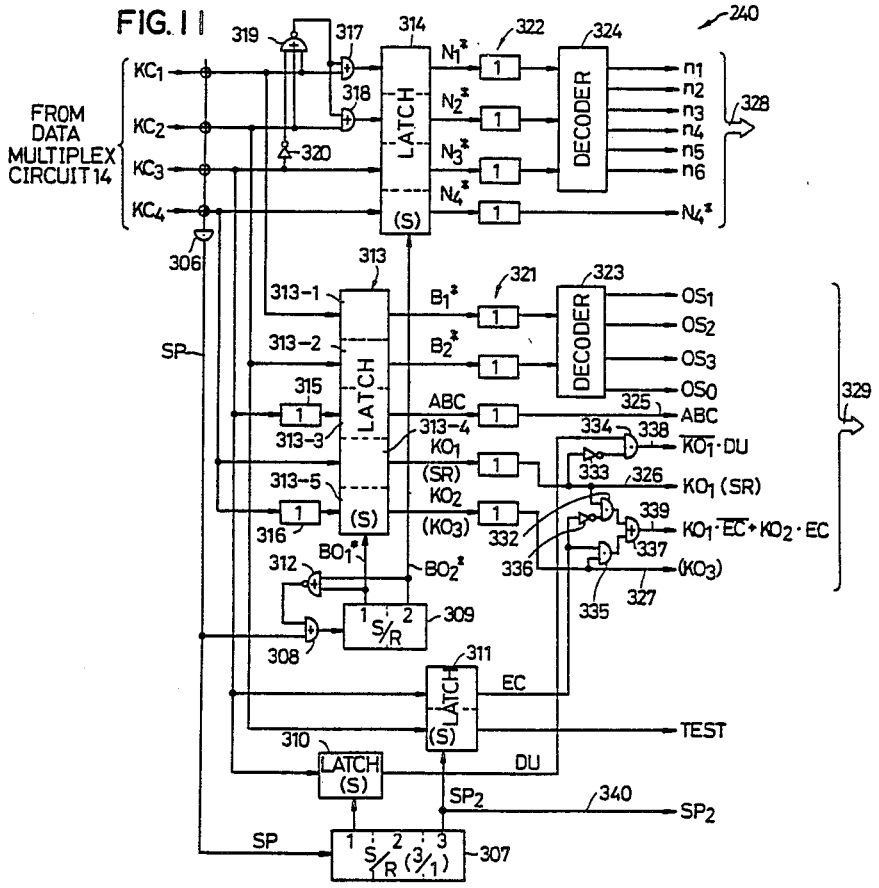
FIG. 11 is a block diagram illustrating a multiplex data analysis circuit in FIG. 10 in detail.

The multiplex data analysis circuit 240 is shown in FIG. 11 in more detail. The data $KC_1$–$KC_4$ applied thereto from the data multiplex circuit 14 are applied to an AND circuit 306, thereby to detect the timing of delivering the reference data "1 1 1 1" (the reference timing, the time slot 1 in FIG. 9). The output of the AND circuit 306 is raised to "1" at the reference data delivery timing. The output signal "1" of the AND circuit 306 which is provided in accordance with the reference data will be called a reference pulse SP hereinafter (cf. the part (a) of FIG. 12). The reference pulse SP is inputted into a shift register 307 and into a shift register 309 through an OR circuit 308. The reference pulse SP is outputted from the first stage of the shift register 307 after one bit time, and it is applied to the strobe terminal (S) of a latch circuit 310 thereby to input the data $KC_3$ applied to the data input terminal of the latch circuit 310 thereinto. At the next delivery time of the reference data (the time slot 2 in FIG. 9), the damper signal DU is delivered as the data $KC_3$, and therefore the damper signal DU is stored in the latch circuit 310. This storage is maintained until the next damper signal DU is delivered as the data $KC_3$. A pulse $SP_2$obtained by delaying the reference pulse SP by three bit times is outputted from the third stage of the shift register 307 (the part (b) of FIG. 12). This pulse $SP_2$ is applied to the strobe terminal (S) of a latch circuit 311 operating to input the input data thereinto. The data $KC_2$ and $KC_3$ are applied to the 2-bit latch circuit 311. The test signal TEST and the envelope control signal EC delivered as the data $KC_2$ and $KC_3$ at the time slot 4 in FIG. 9 are latched with the aid of the pulse $SP_2$.

In the 2-stage shift register 309, the outputs of the two stages are fed back to the input side thereof through a NOR circuit 132 and an OR circuit 308. A signal obtained by delaying the reference pulse SP by one bit time is outputted from the first stage of the shift register 309, and in this case the output of the NOR circuit 312 is at "0". Then, the signal "1" of the first stage of the shift register 309 is shifted to the second stage. In this case also, the output of the NOR circuit 312 is at "0". Then, the outputs of the two stages of the shift register 309 are changed to "0" at the third bit time (the time slot 4 in FIG. 9) from the generation timing of the reference pulse SP, while the output of the NOR circuit 312 is raised to "1". Therefore, the signal "1" is read into the first stage of the shift register 309, and the output of the first stage is raised to "1" at the fourth bit time from the generation timing of the reference pulse SP. Thus, the signal "1" is inputted into each stage of the shift register 309 every 3 bit times (the part (c) of FIG. 12). The reference pulse SP is generated at the first delivery timing in the time division process time zone (3 bit times). Therefore, the output $BO_1$* of the first stage of the shift register 309 is generated at the second delivery timing, while the output $BO_2$* of the second stage of the shift register 309 is generated at the last delivery timing. Accordingly, the output signals $BO_1$* and $BO_2$* of the two stages of the shift register 309 are raised to "1" repeatedly in synchronization with the generation timing of the signals $BO_1$ and $BO_2$ shown in the parts (b) and (c) of FIG. 8 (cf. the (d) and (e) of FIG. 12).

The signal $BO_1$* is applied to the strobe terminal (S) of a latch circuit 313, thus operating to store data (mainly being the block code $B_1$*–$B_3$* and the first key-on signal $KO_1$) delivered out at the second delivery timing in the latch circuit 313. On the other hand, the signal $BO_2$* is applied to the strobe terminal (S) of a latch circuit 314, thus operating to store the note code $N_1$*–$N_4$* delivered at the last delivery timing in the latch circuit 314.

The latch circuit 313 has five latch positions to latch the block code $B_1$*, $B_2$*, the automatic bass chord selection signal ABC, the first key-on signal $KO_1$ and the second key-on signal $KO_2$, respectively. The slow rock selection signal SR is latched ta the same position as the first key-on signal $KO_1$, and the automatic chord key-on signal $KO_3$ is latch at the same position as the second key-on signal $KO_2$. The third bit data $B_3$* of the block code $B_1$*–$B_3$* is not latched by the latch circuit 313, because the note $C_3$ of the upper keyboard and the note $C_2$ of the lower keyboard are not produced by the digital tone generator section 16. As is apparent from Table 2, the tone whose block code is "0 0 0" are only the tones ($C_3$ and $C_2$) in the upper and lower keyboards. Therefore, by cancelling these tones ($C_3$ and $C_2$) the tone range of the upper keyboard is made to be a range of $C_3$#–$C_7$, and the tone range of the lower keyboard is made to be a range of $C_2$#–$C_6$. Accordingly, in this case, the bit $B_3$* of the block code is unnecessary, and all the octave ranges of the upper keyboard, the lower keyboard, the pedal keyboard and the automatic arpegio can be determined from the contents of the bits $B_1$* and $B_2$*. For this reason, the data bit $B_3$* is not latched by the latch circuit 313. The use of the bit $B_3$* may be accomplished by adding one latch position in the latch circuit 313.

The data $KC_1$ and $KC_2$ are applied to latch positions 313-1 and 313-2 in the latch circuit 313. As the data $KC_1$ and $KC_2$ are latched at the second delivery timing with the aid or the signal $BO_1$*, the bit $B_1$* of the block code is latched at the latch positions 313-1, while the bit $B_2$* of the block code is latched at the latch position 313-2. The data $KC_3$ is inputted to a latch position 313-3 of the latch circuit 313 through a delay flip-flop 315. The automatic bass chord selection signal ABC is latched at this latch position 313-3. However, since the automatic bass chord selection signal ABC is delivered at the first delivery timing (the time slot 46 in FIG. 9), it does not coincide with the generation timing of the signal $BO_1$* if it is left as it is. Therefore, the data $KC_3$ is delayed by one bit time by means of a delay flip-flop 315, so that the timing of the automatic bass chord selection signal ABC coincides with that of the signal $BO_1$*.

The data $KC_4$ is inputted to a latch position 313-4 of the latch circuit 313. Since the data $KC_4$ is latched at the second delivery timing with the aid of the signal $BO_1$*, the first key-on signal $KO_1$ is latched at the latch position 313-4. However, it should be noted that this is effected for the first through thirteenth channels and the fifteenth and sixteenth channels. As the data $KC_4$ at the second delivery timing with respect to the fourteenth channel is the slow rock selection signal SR (cf. the time slot 47 in FIG. 9), the slow rock selection signal SR is latched at the latch position 313-4 only in the time division process time zone of the fourteenth channel.

The data $KC_4$ is applied through a delay flip-flop 316 to a latch position 313-5 of the latch circuit 313. The second key-on signal $KO_2$ or the automatic chord key-on signal $KO_3$ is latched at the latch position 313-5. These key-on signals $KO_2$ and $KO_3$ are delivered at the first delivery timing in the time division process time zone of each channel. Therefore, the data $KC_4$ is delayed by one bit time by the delay flip-flop 316, so that the timing of the key-on signal $KO_2$ or $KO_3$ coincides with that of the signal $BO_1$*. As is clear from FIG. 9, the second key-on signal $KO_2$ is latched in the latch position 313-3 in the time division process time zones of the second through thirteenth, fifteenth and sixteenth channels, and the automatic chord key-on signal $KO_3$ is latched in the latch position 313-5 in the time division process time zone of the fourteenth channel.

The signal $BO_2$* outputted from the second stage of the shift register 309 is applied to the strobe terminal (S) of a latch circuit 314. The data $KC_1$–$KC_4$ are applied to the 4-bit latch circuit 314. The data $KC_1$ and $KC_2$ are applied respectively through OR circuits 317 and 318 to the latch circuit 314. Furthermore, the data $KC_1$ and $KC_2$ are applied to a NOR circuit 319 to which the data $KC_3$ is applied through an inverter 320. This NOR circuit 319 is to detect the fact that the note code $N_1$*–$N_4$* (0 0 1 1) of the note C has been delivered. When the cata $KC_1$, $KC_2$, $KC_3$ corresponding to the bits $N_1$*, $N_2$*, $N_3$* has "0 0 1", the NOR circuit is operated to output a signal "1". This output signal "1" of the NOR circuit 319 is applied through the OR circuits 317 and 318 to the latch circuit 314. Accordingly, the note code $N_1$*–$N_4$* of the note C is changed from the value "0 0 1" to its original value "1 1 1 1" which is latched in the latch circuit 314. The note code $N_4$, $N_3$, $N_2$, $N_1$ of the note C in the force stage of the digital tone generator section 16 has been made to be "1 1 0 0" because it may not be mistaken for the reference data "1 1 1 1".

The contents of the latch circuit 313 and 314 are rewritten every time division process time zone of each channel (every 3 bit times). Accordingly, it can be understood from the outputs of the latch circuits 313 and 314 that the note codes $N_1$*–$N_4$*, block codes $B_1$*, $B_2$*, and key-on signal $KO_1$ and $KO_2$ of the notes assigned to the channels are successively in time division manner (with 3-bit time width). On the other hand, the automatic bass chord selection signal ABC, the slow rock selection signal SR, and the automatic chord key-on signal $KO_3$ are simultaneously outputted by the latch circuit 313 in the time zone for the fourteenth channel.

As is indicated in the parts (f) and (g) of FIG. 12, the timing of the data $B_1$*–$KO_2$($KO_3$) outputted by the latch circuit 313 is later by one bit time than that timing of the data $N_1$*–$N_4$* outputted by the latch circuit 314. In the part (f) and (g) of FIG. 12, the timing of the data $B_1$–$KO_2$($KO_3$) outputted by the latch circuit 313 and the timing of the data $N_1$*–$N_4$* outputted by the latch circuit 314, and numerals therein designates the channels, the order of which is the same as that shown in FIG. 9.

The outputs of the latch circuits 313 and 314 are delayed by one bit time by flip-flop groups 321 and 322, respectively. The timing thus delay is indicated by the broken lines in the parts (f) and (g) of FIG. 12. After being delayed by the delay flip-flop group 322, the block code $B_1$*, $B_2$* is applied to a decoder 323, where it is decoded into data $OS_1$, $OS_2$, $OS_3$ and $OS_0$ for every octave. The relationships between the input and output of the decoder are as indicated in Table 3 below:

TABLE 3

| Block Code | | |
|---|---|---|
| $B_2$* | $B_1$* | Octave Selection Data |
| 0 | 1 | $OS_1$ |
| 1 | 0 | $OS_2$ |
| 1 | 1 | $OS_3$ |
| 0 | 0 | $OS_0$ |

The relationships between the tone ranges and the octave selection data $OS_1$, $OS_2$, $OS_3$ and $OS_0$ in each keyboard can be readily understood from Table 2 and Table 3.

After being delayed by the delay flip-flop group 322, the three higher significant bits, or the note code data $N_1$*, $N_2$, $N_3$, are applied to a decoder 324, where they are decoded into six note selection data $n_1$ through $n_6$. The relationships between the input and the output of the decoder 324 are as indicated in Table 4.

TABLE 4

| $N_1$* | $N_2$* | $N_3$* | Note Selection Data | Note | |
|---|---|---|---|---|---|
| 0 | 0 | 1 | $n_1$ | C# | G |
| 0 | 1 | 0 | $n_2$ | D | G# |
| 0 | 1 | 1 | $n_3$ | D# | A |
| 1 | 0 | 1 | $n_4$ | E | A# |
| 1 | 1 | 0 | $n_5$ | F | B |
| 1 | 1 | 1 | $n_6$ | F# | C |

As is apparent from Table 4, each of the note selection data $n_1$–$n_6$ corresponds to two notes. The true correspondence of a note selection data to one of the two notes can be determined by the fourth bit's note code data $N_4$ which are simultaneously applied. The reason for this is clear from Table 1 and Table 4. That is, if the data $N_4$*($N_4$) is "0", then the note is one of the tones C# through F#; and if it is "1", then it is one of the tones C through F. Of course, this is under the condition that the note code $N_1$*–$N_4$* of the note C is converted into "1 1 1 1".

The reason why the note codes $N_1$*–$N_4$ and the block codes $B_1$*, $B_2$* are decoded into the note selection data $n_1$–$n_6$, $N_4$* and octave selection data $OS_1$–$OS_0$, is as follows: In accordance with these selection data $n_1$–$n_6$, $N_4$* and $OS_1$–$OS_0$, the tone generators 247 through 257 (FIG. 10) are allowed to directly select the tone source signals of the tones assigned to the relevant channels.

The note selection data $n_1$–$n_6$ and $N_4$* are applied, in a parallel mode, to the latch circuits 290–305 provided for the tone generators 242–257 of the channels, while the octave selection data $OS_1$, $OS_2$, $OS_3$ and $OS_4$ are applied, in a parallel mode, to the latch circuits 274–289 provided respectively for the tone generators 242–257. The data buses 328 and 329 in FIG. 11 are the same as the data buses 328 and 329 in FIG. 10. The key-on signal $KO_1$ and the pieces of control information ABC . . . which are outputted to the data bus 329 with the same timing as that of the octave selection data $OS_1$–$OS_0$ are not always applied to all of the tone generators 242–257, because these pieces of information are used for the limited keyboards.

This will be described in more detail. The first key-on signal $KO_1$ introduced to a line 326 thrugh the delay flip-flop group 321 from the latch position 313-4 in the latch circuit 313 is used with the pedal keyboard's channel. The automatic bass chord selection signal ABC, the slow rock selection signal SR, and the automatic chord key-on signal $KO_3$ introduced to lines 325, 326 and 327 from the latch positions 313-3, 313-4 and 313-5 of the latch circuit 313 are used for the automatic chord's amplitude envelope control. For this purpose, in the tone generator main section 241 in FIG. 10, an automatic chord envelope control section 330 is provided, whereby the signals ABC, SR and $KO_3$ are latched, in a parallel mode, by a latch circuit 331 and are supplied to the control section 330.

In the upper keyboard and the lower keyboard, the first key-on signal $KO_1$ and the second key-on signal $KO_2$ are properly used in accordance with the envelope control signal EC. Such proper use is not effected for the pedal keyboard in this embodiment. In addition, the damper signal DU is used for the upper keyboard tone only. Thus, after being processed at the side of the multiplex data analysis circuit 240, the key-on signals $KO_1$ and $KO_2$ concerning the upper keyboard and the lower keyboard are supplied to the tone generator main section 241.

The first key-on signal $KO_1$ outputted through the delay flip-flop group 321 from the latch position 313-4 in the latch circuit 313 is applied to an AND circuit 332 and to an AND circuit 334 through an inverter 333. The damper signal DU stored in the latch circuit 310 is applied to the other input terminal of the AND circuit 334. Accordingly, the output of the AND circuit 334 is raised to "1" with "$\overline{KO_1}$·DU". In the upper keyboard's exclusive channel, the first key-on signal $KO_1$ is provided in compliance with the key depression. Therefore, the fact that "$\overline{KO_1}$ is "1" means that "$KO_1$" is "0", that is, the key release has been effected. Accordingly, if a key of the upper keyboard is released where the damp mode has been selected (DU="1"), the output signal $\overline{KO_1}$·DU of the AND circuit 334 is raised to "1". This signal $\overline{KO_1}$·DU instructs that the production of a tone which is in a damp state by key release should be quickly finished.

The second key-on signal $KO_2$ outputted through the delay flip-flop group 321 from the latch position 313-5 of the latch circuit 313 is applied to one input terminal of an AND circuit 335, to the other input terminal of which the envelope control signal EC stored in the latch circuit 311 is applied. This signal EC is further applied through an inverter 336 to the AND circuit 332. The outputs of the AND circuits 332 and 335 are applied to an OR circuit 337. Thus, the condition expression of the output of the OR circuit 337 is ($KO_1 \cdot \overline{EC} + KO_2EC$). This output signal ($KO_1EC + KO_2EC$) of the OR circuit 337 is utilized as an upper keyboard key-on signal (or a lower keyboard key-on signal) representative of the key depression time of an upper keyboard tone (or a lower keyboard tone). That is, when the envelope control signal EC is at "0", the same signal as the first key-on signal $KO_1$ is outputted, as the upper or lower keyboard key-on signal, by the OR circuit 337. This means that the upper keyboard tone or the lower keyboard tone is produced only for the period of time during which the key is actually depressed. When the envelope control signal EC is at "1", a signal having the same time width as that of the second key-on signal $KO_2$ is outputted by the OR circuit 337. Since the second key-on signal $KO_2$ is a (short) signal lasting for about 10 ms like an attack signal, the upper keyboard tone or the lower keyboard tone is produced only for the short period of time (about 10 ms) immediately after the key depression. The relationships between the tone generators 242 through 257 and the tone production channels and the keyboards are as indicated in Table 5.

TABLE 5

| Tone Generator | Channel | Keyboard |
|---|---|---|
| 242 | 1 | Pedal keyboard |
| 243 | 4 | |
| 244 | 7 | |
| 245 | 10 | Upper keyboard |
| 246 | 13 | |
| 347 | 16 | |
| 248 | 3 | |
| 249 | 6 | |
| 250 | 9 | |
| 251 | 12 | Lower keyboard |
| 252 | 15 | |
| 253 | 2 | |
| 254 | 5 | |
| 255 | 8 | |
| 256 | 11 | |

TABLE 5-continued

| Tone Generator | Channel | Keyboard |
|---|---|---|
| 257 | 14 | Automatic arpeggio |

The tone generators 244 through 248 and 251 through 255 are not shown in FIG. 10. As is apparent from the above description and Table 5, the latch circuits 274 through 289 and 331 to which the pieces of control information ABC, etc. and the key-on signal $KO_1$ are applied through the data bus 329 by the multiplex data analysis circuit 240 are as indicated in Table 6 below:

| Data | Latch Circuit |
|---|---|
| ABC on the line 325 | 331 |
| SR on the line 326 | 331 |
| $KO_3$ on the line 327 | 331 |
| $\overline{KO_1}$.DU on the line 338 | 275 through 281, and 282 through |
| $KO_1 \cdot \overline{EC} + KO_2 \cdot EC$ on the line 339 | 288 |
| $KO_1$ on the line 326 | 274 |

Figure 12:
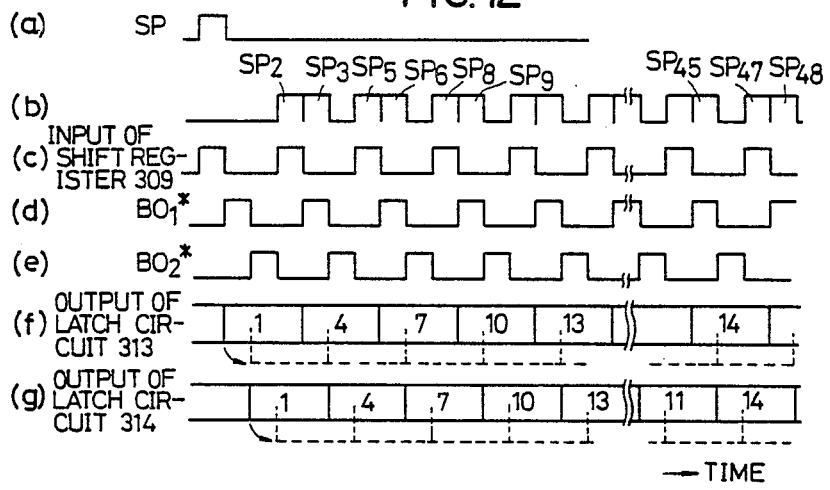
FIG. 12 is a timing chart for a description of the operation of the multiplex data analysis circuit shown in FIG. 11.

The reference pulse $SP_2$ (the part (b) of FIG. 12) outputted from the third stage in the shift register 307 in FIG. 11 is applied through the line 340 to the shift register 258 in FIG. 10, and it is applied also to the strobe terminal of the latch circuit 274 (FIG. 10). The (timing) relationships between the data supplied to the data bus 329 and the channels are as indicated by the broken lines in the part (f) of FIG. 12. As a apparent from the parts (b) and (f) of FIG. 12, when the pulse $SP_2$ is provided, the center time slot of the first channel's time zone (3-bit time width) occurs, and accordingly the key-on data $KO_1$ and the octave selection data $OS_1$–$OS_0$ concerning the first channel have been positively inputted into the latch circuit 274 with the timing of the pulse $SP_2$, and these data $OS_1$–$OS_0$ and $KO_1$ are latched by the latch circuit 274 with the aid of the pulse $SP_2$.

Pulses $SP_5$, $SP_8$, $SP_{11}$ . . . $SP_{23}$, $SP_{26}$, . . . $SP_{44}$, and $SP_{47}$ obtained by successively delaying the pulse $SP_2$ by three bit times by 3-stage shift registers 248, 259 . . . 265, and 266 . . . 272 are applied to the strobe terminals (S) of the latch circuits 275 through 289 and 331 provided for the tone generators 243 through 257, respectively. These pulses $SP_5$, $SP_8$, . . . $SP_{23}$, $SP_{26}$, . . . $SP_{44}$ and $SP_{47}$ spaced at three bit time intervals correspond to the delivery timing of the data $OS_1$–$OS_0$, $KO_1$, etc. of the channels which are delivered to the data bus 329, respectively. Accordingly, the octave data $OS_1$–$OS_0$, the key-on signal $KO_1$, etc. of the channels which are subjected to time division multiplex on the data bus 329 are distributed separately according to the channels (to the tone generators 242 through 257), and are stored in the latch circuits 275 through 289 of the channels, respectively. Furthermore, the signals ABC, SR and $KO_3$ relating to the automatic chord are stored in the latch circuit 331 in response to the pulse $SP_{47}$ with the timing of the fourteenth channel.

Pulses $SP_3$, $SP_6$, $SP_9$ . . . $SP_{24}$, $SP_{27}$. . . $SP_{45}$ and $SP_{48}$ outputted from the first stages of the shift registers 258 through 273 are applied to the strobe terminals (S) of the latch circuits 290 through 305 provided for the channels, respectively. These pulses $SP_3$, $SP_6$, $SP_9$ . . .

$SP_{24}$, $SP_{27}$ . . . $SP_{45}$ and $SP_{48}$ are also provided at three bit time intervals, but they are delayed by one bit time from the aforementioned pulses $SP_2$, $SP_5$, $SP_8$ . . . $SP_{23}$, $SP_{26}$ . . . $SP_{44}$ and $SP_{47}$ (cf. the part (b) of FIG. 12). The note selection data $n_1$ through $n_6$ are applied through a note selection data bus 328 to the latch circuits 290 through 305, respectively. The (timing) relationships between the data $n_1$ through $n_6$ supplied to the note selection data bus 328 and the channels are as indicated by the broken lines in the part (g) of FIG. 12. Accordingly, in the channels, the timing of generating the pulses $SP_3$, $SP_6$, . . . $SP_{24}$, $SP_{27}$, . . . $SP_{45}$ and $SP_{46}$ from the first stages of the shift registers 258 through 273 coincides with the timing of applying the note selection data $n_1$ through $n_6$ concerning the relevant channels to the latch circuits 290 through 305 through the data bus 328. Accordingly, the note selection data $n_1$–$n_6$ and $N_4$* of the channels which are subjected to time division multiplex on the data bus are distributed separately according to the channels (to the tone generators 242 through 257), and are stored in the latch circuits 290 through 305 provided for the channels, respectively.

That is, the note selection data $n_1$–$n_6$ and $N_4$* and the octave selection data $OS_1$, $OS_2$, $OS_3$ and $OS_0$ concerning the tones assigned to the channels are maintained stored in the latch circuits 274 through 289 and 290 through 305 provided for the tone generators 242 through 257, respectively. Maintained stored in the latch circuit 274 for the tone generator 242 is the first key-on signal $KO_1$ of a tone assigned to the relevant channel. When an automatic bass tone is assigned to the pedal keyboard's exclusive channel, the attack system (about 10 ms) key-on signal $KO_1$ is stored in the latch circuit 274 for the pedal keyboard's exclusive channel, as was described before.

The key-on signals ($KO_1 \cdot \overline{EC} + KO_2 \cdot EC$) and the damp instruction signals ($\overline{KO} \cdot DU$) of tones assigned to the relevant channels are maintained stored in the latch circuits 275 through 281 provided for the tone generators 242 through 249 concerning the upper keyboard, respectively.

The key on signals ($KO_1 \cdot \overline{EC} + KO_2 \cdot EC$) of tones assigned to the relevant channels are maintained stored in the latch circuits 282 through 288 provided for the tone generators 250 through 256 concerning the lower keyboard, respectively.

The note selection data $n_1$–$n_6$ and $N_4$*, the octave selection data $OS_1$–$OS_0$, the key-on signals $KO_1$ and ($KO_1 \cdot \overline{EC} + KO_2 \cdot EC$) or the damp instruction signals ($\overline{KO_1} \cdot DU$) maintained stored in the latch circuits 274 through 289 and 290 through 305 are utilized in the tone generators 242 through 257 to cause the respective tone generators 242 through 257 to produce the tones assigned to the respective channels. Furthermore, the automatic bass chord selection signal ABC, the slow rock selection signal SR, and the automatic chord key-on signal $KO_3$ stored in the latch circuit 331 are utilized in the automatic chord envelope control section 330. The output of the automatic chord envelope control section 330 is used to control the envelopes of tones produced by the lower keyboard's tone generators 250 through 256. In this connection, it should be noted that the automatic chord is produced as the lower keyboard tone. In the lower keyboard's tone generators 250 through 256, damp characteristics are given to the envelopes of automatic chords under the control of the automatic chord envelope control section 330.

The tone generators 242 through 257 operate to produce the musical tone signals (tone source signals) of notes specified by the note selection data $n_1$–$n_6$ and $N_4$* stored in the respective latch circuits 290 through 305. These musical tone signals (tone source signals) are produced in the octave ranges specified by the octave selection data $OS_1$–$OS_0$ stored in the respective latch circuits 274 through 289. The tone generators 242 through 257 are so designed that they can produce musical tone signals concerning a plurality of foot systems at the same time.

For instance an 8-foot system pedal keyboard musical tone signal P8′ and a 16-foot system pedal keyboard musical tone signal P16′ are provided by the tone generator 242 of the pedal keyboard's exclusive channel. The seven tone generators 243 through 249 of the upper keyboard's exclusive channel provide 2-foot system 4-foot system, 8-foot system and 16-foot system upper keyboard musical tone signals $U_2'$, $U_4'$, $U_8'$ and $U_{16}'$. The output musical tone signals of the tone generators 242 through 249 are mixed for every foot system and are provided through the digital tone generator 16. In the lower keyboard's tone generators 250 through 256, 2-foot system, 4-foot system and 8-foot system lower keyboard musical tone signals $L_2'$, $L_4'$ and $L_8'$ are provided, and furthermore 4-foot system and 8-foot system automatic chord signals $A_4'$ and $A_8'$ are provided. In an ordinary lower keyboard performance, the lower keyboard musical tone signals $L_2'$, $L_4'$ and $L_8'$ are produced; and in an automatic bass chord performance, the automatic chord signals $A_4'$ and $A_8'$ are roduced. These musical tone signals $L_2'$, $L_4'$ and $L_8'$ and automatic chord signals $A_4'$ and $A_8'$ are subjected to mixing for every foot system, and are outputted by the digital tone generator section 16. The tone generator 257 corresponding to the automatic arpeggio's exclusive channel produces 2-foot system and 4-foot system automatic arpeggio musical tone signals $AR_2'$ and $AR_4'$.

The tone generators 242 through 257 may be so designed that each can produce musical tone signals covering all the tone pitches. However, in this case, the construction of each of the tone generators 242 through 257 becomes necessarily intricate which will result in an increase of manufacturing cost. In view of this, a frequency division signal generating section 341 is provided as shown in FIG. 10, so that musical tone signals covering all the tone pitches which can be provided by this embodiment are produced in accordance with a frequency division system. The submultiple frequency signals generated by the submultiple frequency signal generator section 341 are supplied to the tone generators 242 through 257, so as to select the frequency division signal which corresponds to the contents of the note selection data $n_1$–$n_6$ and $N_4$* and the octave selection data $OS_1$–$OS_0$ stored in the latch circuits 274 through 289 and 290 through 257. For simplification, a connection diagram illustrating the supply of the submultiple frequency signals (tone source signals) having various frequencies to the tone generators 242 through 257 from the submultiple frequency signal generating circuit 431 is omitted from FIG. 10.

Detailed description of the tone generator

Figure 14:
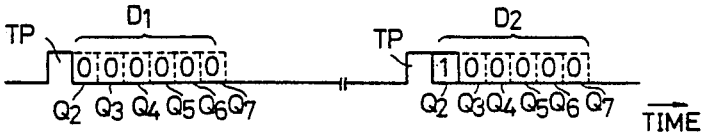
FIG. 14 is a timing chart showing a state of submultiple frequency data generated in series by the submultiple frequency wave signal generator.

The generator 341 comprises wave generation circuits 341-1 through 341-12 corresponding respectively to the twelve notes C#, D, D#, . . . B and C. As the wave generation circuits 341-1 through 341-12, the multiplexed data generator described in the specification of U.S. patent application Ser. No. 915,239 filed 6/13/78, and assigned to the assignee of the present case may, for example, be employed. In such wave generation circuits, a master clock pulse $\phi M$ is counted by a maximum length counter 343 capable of variably setting its modulo number as is schematically shown in the circuit 341-1 so as to produce a pulse of high frequency corresponding to the note C and a plurality of submultiple frequency wave data is produced from this pulse by means of a submultiple frequency data forming circuit consisting of serially connected shift registers 344 and a one-bit adder 345. In this manner, a plurality of submultiple frequency data corresponding to the frequency of the note C is outputted through a submultiple frequency data line 342-1. Each submultiple frequency data is outputted on the submultiple frequency data line 342-1 each time at least the value of the bit corresponding to the highest frequency is turned to "1" or "0". In other words, the timing at which the value of the bit corresponding to the highest frequency is turned over is a minimum unit of variation of the submultiple frequency data. The other circuits 341-2 through 341-12 for the notes C# through B are of a similar construction except that the modulo number of the maximum length counter 343 is different depending upon the frequency of the note. FIG. 14 illustrates an example of a state of the submultiple frequency data serially outputted from the wave generation circuit 341-1 (or 341-2 through 341-12) on the submultiple frequency data line 342-1 (or 342-2 through 341-12). A timing pulse TP appears preceding to each of submultiple frequency data train, $D_1$, $D_2$ . . . The timing at which the data train $D_1$, $D_2$ . . . exists is known by existence of the timing pulse TP. In the data train $D_1$, $D_2$ . . . , submultiple frequency data $Q_2$–$Q_7$ is serially outputted following the timing pulse TP. The submultiple frequency data $Q_2$–$Q_8$ provided on the data lines 342-1 through 342-12 is supplied to the upper keyboard tone generators 243 through 249, the lower keyboard tone generators 250 through 256 and the automatic arpeggio tone generator 257. The data on the data lines 342-1 through 342-12 is not applied to the pedal keyboard tone generator 242 which operates in response to a different clock pulse. This is because the master clock pulse $\phi M$ itself is frequency-modulated for producing a vibrato effect in this embodiment. In other words, the different pulse is used in the pedal keyboard tone generator 242 so that the vibrato effect is produced only in the upper and lower keyboards and not in the pedal keyboard.

Upper keyboard tone generator

Figure 15:
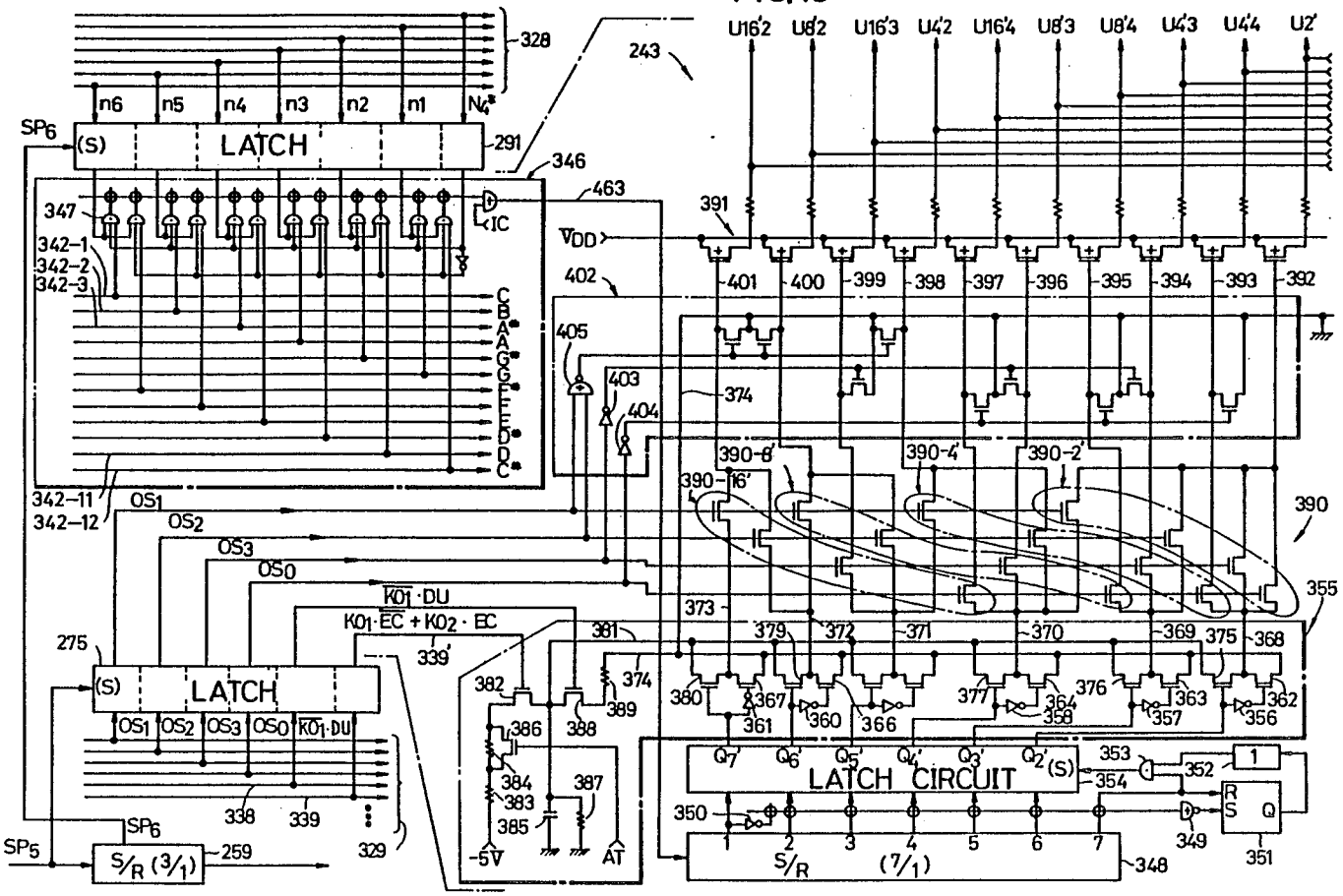
FIG. 15 is a circuit diagram illustrating in detail an example of the upper keyboard tone generator shown FIG. 10.

As an example of the upper keyboard tone generators 243 through 249, the tone generator 243 concerning the fourth channel is shown in detail in FIG. 15. The other tone generators 244 through 249 are of the same construction.

With reference to FIG. 15, the submultiple frequency data on the lines 342-1 through 342-12 is applied to a note selection circuit 356. The note selection circuit 346 selects submultiple frequency data $Q_2$–$Q_7$ on a single one of the lines 342-1 through 342-12 in accordance with the note selection data $n_1$–$n_6$ and $N_4$* concerning the specified channel stored in the latch circuit 291. For example, if the note C is assigned to the fourth channel, the note selection data $n_1$–$n_6$ and $N_4$* is made up of $n_6$ and $N_4$* which are "1" and $n_1$–$N_5$ which are all "0" (Table 5). Accordingly, an AND gate 347 in the note selection circuit 346 is enabled to select the submultiple frequency data $Q_2$–$Q_7$ for the note C on the line 342-1.

The submultiple frequency data $Q_2$–$Q_7$ selected by the note selection circuit 346 is applied to a seven-stage shift register 348 through a line 463. As shown in FIG. 14, the timing pulse TP appears immediately before the submultiple frequency data $Q_2$–$Q_7$. When this timing pulse TP has entered the first stage of the shift register 348, contents of the preceding second through seventh stages are all "0". The timing pulse TP appears at the top of the submultiple frequency data train and no data exists at least during 6 bit time before the timing pulse TP appears. The outputs of the second through seventh stages of the shift register 348 are applied to a NOR gate 349 without any modification and the output of the first stage is applied to the NOR gate 349 after being inverted by an inverter 350. Accordingly, when the timing pulse TP has entered the first stage of the shift register 348, the output of the NOR gate 349 is turned to "1". A set-reset type flip-flop 351 is set by the output "1" of the NOR gate 349 and the set output of the flip-flop 351 is applied to an AND gate 353 after being delayed by 1 bit time by a delay flip-flop. When the timing pulse TP of the first stage of the shift register 348 has entered the seventh stage after lapse of 6 bit time, the flip-flop 351 is reset and the AND gate 351 is enabled by the output "1" of the seventh stage. The output "1" of the AND gate 353 is applied to a strobe terminal (S) of a latch circuit 354. Since the output of the delay flip-flop 352 falls to "0" 1 bit later, the output of the AND gate 353 is "1" only during 1 bit time. At this time, the data Q is in the sixth stage of the shift register 348, the data $Q_3$ in the fifth stage, the data $Q_4$ through $Q_7$ in the fourth down through the first stages, and, accordingly, the data $Q_2$–$Q_7$ is loaded into the 6-bit latch circuit 354 in parallel. In the above described manner, the serial submultiple frequency data $Q_2$–$Q_7$ is converted to parallel data and held by the latch circuit 354. Accordingly, submultiple frequency signals $Q'_2$–$Q'_7$ outputted from respective latch positions of the latch circuit 354 are a square wave signal with a duty factor of 50%. The frequencies of the signals $Q'_3$, $Q'_4$, $Q'_5$, $Q'_6$ and $Q'_7$ are respectively $\frac{1}{2}$, $\frac{1}{4}$, $\frac{1}{8}$, 1/16 and 1/32 that of the signal $Q'_2$ having the highest frequency. Alternatively stated, the submultiple frequency signals $Q'_2$–$Q'_7$ are in an octave relationship relative to each other.

The square wave submultiple frequency signals $Q'_2$–$Q'_7$ outputted by the latch circuit 354 are applied to a gating circuit 355. When the level of the submultiple frequency signals $Q'_2$–$Q'_7$ is "0", field-effect transistors 362 through 367 are turned on through inverters 356–361 to apply the ground voltage 0 from a ground voltage line 374 to tone source signal lines 368 through 373. When the level of the submultiple frequency signals $Q'_2$–$Q'_7$ is "1" field-effect transistors 375 through 380 are turned on to apply an envelope voltage from a line 381 to the tone source signal lines 368 through 373. Accordingly, the submultiple frequency signals $Q'_2$–$Q'_7$ are gates in the gating circuit 355 in accordance with the envelope voltage characteristic and thereafter are provided on the tone source signal lines 368–373.

Envelope Control

The key-on signal "$KO_1 \cdot \overline{EC} + KO_2 \cdot EC$" stored in the latch circuit 275 through the line 339 (FIG. 11) becomes the same signal as the first key-on signal $KO_1$ when the envelope control signal EC is "0" and the same signal as the second key-on signal $KO_2$ when the envelope control signal EC is "1".

When the envelope control signal EC is set at "0", the key-on signal "$KO_1 \cdot \overline{EC} + KO_2 \cdot EC$" appearing on the output line 339' of the latch circuit 275 is the same as the first key-on signal $KO_1$, i.e., "1" only while the assigned key is being depressed. A field-effect transistor 382 is turned on by this signal "1" on the line 339' and a negative voltage of −5 V charged in a capacitor 385 through resistors 383 and 384. The voltage across the capacitor 385 is supplied as the envelope voltage waveshape to the transistors 375 through 380 via the line 381. The resistors 383 and 384 function to provide the envelope voltage waveshape with an attack characteristic and have a relatively small resistance value. If a more abrupt attack shape is desired, the field-effect transistor 386 is turned on by an attack data AT and the resistor 384 is short-circuited. The attack data AT is continuously provided by a switching or the like operation. When the first key-on signal $KO_1$ falls to "0" upon release of the depressed key, the signal on the line 339' is turned to "0" and the transistor 382 is turned off. This causes the voltage of −5 V across the capacitor 385 to be discharged through a resistor 387. The resistor 387 is of a larger resistance value than the resistors 383 and 384 and functions to provide the voltage waveshape on the line 381 with a gradually attenuating decay characteristic.

When the envelope control signal EC is "1", the second key-on signal $KO_2$ of an attack shape which assumes "1" only during about 10 ms after start of depression of the key appears on the line 339'. If, accordingly, the second key-on signal $KO_2$ for the depressed key is turned to "0", the transistor 382 is turned off even while the key is still being depressed and the envelope voltage waveshape on the line 381 is attenuated. In this manner, an attack envelope of a short duration (about 10 ms) is obtained.

When the damper signal DU is "1", the signal $\overline{KO_1} \cdot DU$ becomes "1" upon release of the key and is stored in the latch circuit 275 through the line 338 (FIG. 11). This causes a field effect transistor 388 to be turned on with resulting connection of a resistor 389 to the capacitor 385, the resistor 389 being grounded at one terminal thereof. The capacitor 385 thereby is discharged through the resistors 387 and 389 connected in parallel. Accordingly, the time constant is reduced and a prompt discharge is effected resulting in shortening of the decay time of the envelope voltage shape on the line 381. For this reason, the tone decays rapidly upon release of the key if the damper signal DU is "1".

Octave selection

The tone source signals having been gated and outputted through the tone source signal lines 368 through 373 of the gating circuit 355 (i.e. submultiple frequency signals $Q'_2$–$Q'_7$) are applied to an octave selection circuit 390. In the octave selection circuit 390, tone source signals ($Q'_2$–$Q'_7$) of a desired octave range are selected within four octave ranges with respect to each of the 2 foot, 4 foot, 8 foot and 16 foot systems in accordance with octave selection data $OS_1$, $OS_2$, $OS_3$ and $OS_4$ latched by the latch circuit 375. In the octave selection circuit 390, field-effect transistor groups 290-2', 290-4', 290-8' and 290-16' are provided corresponding to the 2 foot, 4 foot, 8 foot and 16 foot systems. In accordance with single octave selection data which is "1" (one of the octave selection data $OS_1$ through $OS_0$), the field-effect transistors of the respective footage systems are turned on one by one. It should be noted that a tone source signal corresponding to the data $OS_0$ which is for the highest octave does not exist in the 2 foot system. Accordingly, an arrangement is made in the 2 foot system so that if the data So is "1", the tone source signal $Q'_2$ which is for the same frequency as in the case where the data $OS_1$ is "1" is selected.

Assume, for example, that the key for the note $C_4$ has been depressed in the upper keyboard and this key has been assigned to the fourth channel corresponding to the tone generator 243. As will be apparent from the Tables 2 and 3, the octave selection data $OS_1$ only is "1" and the other data $OS_2$ through $OS_0$ is "0". The tone source signals ($Q'_2$–$Q'_7$) of the respective footage corresponding to the note $C_4$ are selected in response to the data $OS_1$.

The output of the octave selection circuit 390 is outputted from the tone generator 242 through source follower type field-effect transistor group 391. The outputs of a field-effect transistor 290-2' of the 2 foot system in the octave selection circuit 390 are all provided on a line 392 and outputted as a 2 foot system musical tones signal U2' through the field-effect transistor group 391. The tone source signal for the fourth octave range of the 4 foot system is outputted as a 4 foot system fourth octave musical tone signal U4'4 through a line 393. The octave range selected by the octave selection data $OS_1$ herein is referred to as the first octave range, that selected by the data $OS_2$ as the second octave range, that selected by the data $OS_3$ as the third octave range and that selected by the data $OS_0$ as the fourth octave range.

The tone source signal for the third octave range of the 4 foot system is outputted as a 4 foot system third octave musical tone signal U4'3 from the octave selection circuit 390 through a line 394. The tone source signal for the fourth octave range of the 8 foot system is outputted as an 8 foot system fourth octave musical tone signal U8'4 from the octave selection circuit 390 through a line 395. The tone source signal for the 8 foot system third octave range is outputted as an 8 foot system third octave musical tone signal U8'3 from the octave selection circuit 390 through a line 396. The tone source signals for the fourth and third octave ranges of the 16 foot system are outputted as a 16 foot system fourth octave musical tone signal U16'4 and a 16 foot system third octave musical tone signal U16'3 respectively from the octave selection circuit 390 through lines 397 and 399.

The tone source signals for the second and first octave ranges of the 4 foot system are commonly provided on a line 398 and are outputted as a 4 foot system low octave range musical tone signal U4'2. The tone source signals for the first and second octave ranges of the 8 foot system are commonly provided on a line 400 and are outputted as an 8 foot system low octave range musical tone signal U8'2. The tone source signals for the first and second octave ranges of the 16 foot system likewise are commonly provided on a line 401 and are outputted as a 16 foot system low octave range musical tone signal U16'2.

The musical tone signals U2' through U16'2 on the output lines 392–401 of the octave selection circuit 390 are mixed with musical tone signals corresponding to footage systems and octave ranges of the other tone generators 244 thrugh 249 (FIG. 10) via source follower type field-effect transistor group 391 and thereafter are outputted from the digital tone generator section 16. In the source follower type field effect transistor group 391, p-channel-depletion type field-effect transistors are employed. The other field-effect transistors used in the present embodiment are p-channel-enhancement type ones. Accordingly, the musical tone signals of a negative amplitude voltage outputted from the octave selection circuit 390 via the lines 392 through 401 are delivered from the field-effect transistor group 391 without being inverted in polarity.

The reason for producing musical tone signals of respective footages for each octave range is that with respect to the upper keyboard tones, the tone level is corrected for each octave in a post-stage circuit (not shown) of the digital tone generator section 16. For example, by correcting the tone level in such a manner that the tone level of high octave tones will become relatively large and that of low octave tones will become relatively small, the post-stage circuit effects a control for accoustically balancing the tone levels of the high octave tones and the low octave tones. For this purpose, the musical tones of the respective footages (U2', U4', U8' and U16') are divided into the fourth octave range (U4'4, U8'4 and U16'4), the third octave range (U4'3, U8'3 and U16'3) and the low octave range (U4'2, U8'2 and U16'2) for the tone level correction in the post-stage circuit.

A circuit 402 is provided between the octave selection circuit 390 and the field-effect transistor group 391 for making the potential of the output lines 393 through 401 of tone source signals not selected by the octave selection data $OS_1$–$OS_0$ ground potential. More specifically, when the octave selection data $OS_1$–$OS_0$ is "0", corresponding field-effect transistors in the circuit 402 are turned on through an inverter 403 or 404 or a NOR gate 405 and lines among the lines 393 through 401 corresponding to the data $OS_1$–$OS_0$ which is "0" are connected to the ground line 374 through the field-effect transistors which are on. As for the line 392, tone source signals of all octave ranges of the 2 foot system are applied to the line 392 and tone source signals selected by any of the data $OS_1$–$OS_0$ appear on the line 392 so that the above described arrangement provided for the lines 393 through 401 is unnecessary.

Lower keyboard tone generator

Figure 16:
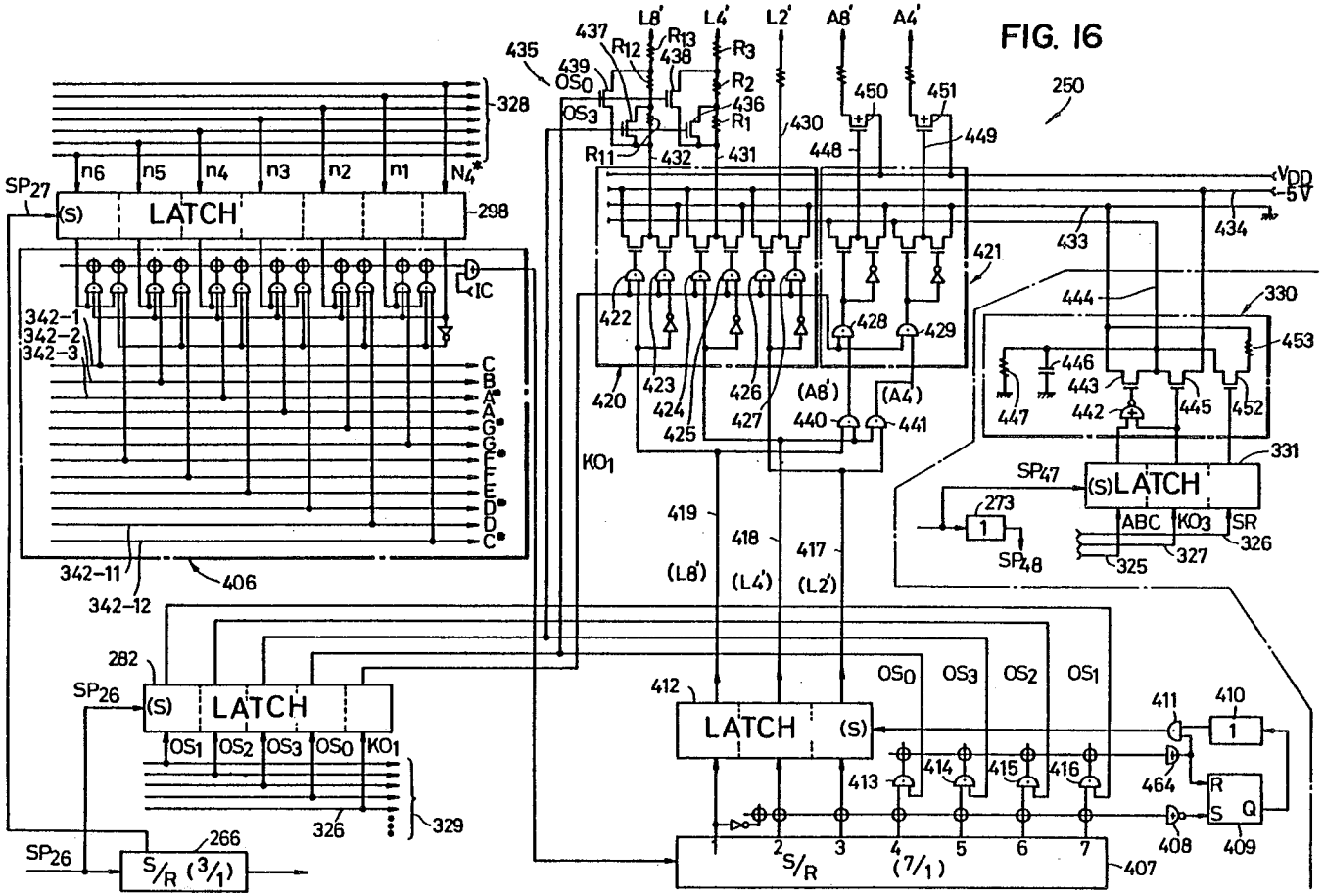
FIG. 16 is a circuit diagram illustrating in detail an example of each of the lower keyboard tone generator and the automatic chord tone envelope control section shown in FIG. 10.

As an example of the lower keyboard tone generator, the tone generator 250 for the ninth channel is illustrated in detail in FIG. 16. The other tone generator 251 through 256 are of the same construction.

With reference to FIG. 16, a note selection circuit 406 is of the same construction as the note selection circuit 346 shown in FIG. 15, functioning to select submultiple frequency data on the lines 342-1 through 342-12. It is possible to employ the same gating circuit and octave selection circuit as are shown in FIG. 15, but in the present example an octave selection circuit is made different from that of FIG. 15 by utilizing the fact that the submultiple frequency data $Q_2$–$Q_7$ is serially produced.

A 7-stage shift register 407, a NOR gate 408, a set-reset type flip-flop 409, a delay flip-flop 410 and an AND gate 411 to which the submultiple frequency data $Q_2$–$Q_7$ corresponding to the notes of the tones assigned to the respective channels and selected by the note selection circuit 406 is applied operate substantially in the same manner as the shift register 348, NOR gate 349, flip-flop 351, delay flip-flop 352 and AND gate 353 shown in FIG. 15. A latch circuit 412 which stores in parallel the submultiple frequency data $Q_2$–$Q_7$ received by the shift register 407 is of a 3 bit, different from the latch circuit 354 shown in FIG. 15. Latch positions of the latch circuit 412 correspond respectively to the 2 foot system (L2'), 4 foot system (L4') and 8 foot system (L8').

The outputs of the first, second and third stages of the shift register 407 are loaded in the latch circuit 412. The octave selection data $OS_0$–$OS_1$ stored in the latch circuit 282 is applied to AND gates 413–416 and a single AND gate (one of the AND gates 413 through 416) corresponding to the octave range of the note assigned to the specified channel is enabled. These AND gates 413 through 416 receive at the other input thereof the outputs of the fourth through seventh stages of the shift register 407.

When the timing pulse TP (FIG. 14) preceding the submultiple frequency data $Q_2$–$Q_7$ has entered the first stage of the shift register 407, the NOR gate 408 is enabled to set the flip-flop 409. When this timing pulse TP has entered the fourth through seventh stages, the AND gate 413 through 416 are enabled to reset the flip-flop 409 through the OR gate 464 and also apply a strobe pulse to the latch circuit 412 through the AND gate 411. As shown in FIG. 14, in the submultiple frequency data train $D_1$, $D_2$ . . . , data $Q_2$, $Q_3$, . . . $Q_7$ is arranged in the order of magnitude of frequency. If, accordingly, the AND gate 413 is enabled for example by the data $OS_0$ corresponding to the fourth octave, the submultiple frequency data present in the first through third stages of the shift register 407 is $Q_4$, $Q_3$ and $Q_2$ when the timing pulse TP has entered the fourth stage of the shift register 407, these data being loaded into the latch circuit 412. If the octave selection data $OS_3$ is "0", the AND gate 414 is enabled to load the submultiple frequency data $Q_5$, $Q_4$ and $Q_3$ in the latch circuit 412.

A square wave signal appearing on an output line 417 of the latch circuit 412 latching the submultiple frequency data of the third stage of the shift register 407 corresponds to the 2 foot system tone source signal L2, a square wave signal appearing on an output line 418 of the latch circuit 412 latching the submultiple frequency data of the second bit corresponds to the 4 foot system tone source signal L4', a square wave signal appearing on an output line 419 of the latch circuit 412 latching the submultiple frequency data of the first bit corresponds to the 8 foot system tone source signal L8'. The octave range of the square wave signals appearing on the lines 417 through 419 differs depending upon the state of the octave selection data $OS_1$–$OS_0$. The relationship between the octave selection data $OS_0$–$OS_1$, the submultiple frequency data $Q_2$–$Q_7$ and the ratio of frequencies thereof is shown in the following Table 7. In Table 7, the frequency of the tone source square wave signal obtained in accordance with the submultiple frequency data $Q_2$ is taken as 1.

TABLE 7

| Latch output line | Ocatave selection data | | | |
|---|---|---|---|---|
| | $OS_0$ | $OS_3$ | $OS_2$ | $OS_1$ |
| 417 | $Q_2$ | $Q_3$ | $Q_4$ | $Q_5$ |
| ($L_22'$) | (1) | (½) | (¼) | (⅛) |
| 418 | $Q_3$ | $Q_4$ | $Q_5$ | $Q_6$ |
| (L4') | (½) | (¼) | (⅛) | (1/16) |
| 419 | $Q_4$ | $Q_5$ | $Q_6$ | $Q_7$ |
| (L8') | (¼) | (⅛) | (1/16) | (1/32) |

Gating of the lower keyboard tones

The first key-on signal $KO_1$ latched in the latch circuit 282 via the line 326 (FIG. 11) is applied to AND gates 422 through 429 of gating circuits 420 and 421 Accordingly, the gating circuits 420 and 421 operate only when the key is being depressed.

The tone source signal provided on the lines 417 through 419 from the latch circuit 412 is a square wave signal with a duty factor of 50%. This tone source signal on the lines 417 through 419 is gate-controlled by the first gating circuit 420 in accordance with the first key-on signal $KO_1$ and thereafter is outputted through lines 430, 431 and 432. If the level of the tone source square wave signal is "0", the ground potential on a ground potential line 433 is delivered on the lines 430 through 432 whereas if the level of the tone source square wave signal is "1", a negative voltage −5 V on a line 434 is delivered on the lines 430 through 432. Since the tone source signals are gate-controlled in accordance with the first key-on signal $KO_1$, the tone source signals L2′, L4′ and L8′ of he respective footage systems are provided with an amplitude envelope of a direct keying type which is abrupt in both rise and fall.

Tone level correction for each octave range

The tone source signals on the lines 430 through 432 are applied to a tone level correction circuit 435 for correction in the tone level according to the octave range thereof. In the above described upper keyboard tone generator 243 through 249, the musical tone signals U2′ through U16′2 are outputted so that the tone level is corrected in a post-stage circuit and not in the tones generators. In the lower keyboard tone generators 250 through 256, the tone source signals of the respective footages on the lines 430 through 432 are corrected in the tone level with respect to each octave and thereafter are outputted as lower keyboard musical tone signals L2′, L4′ and L8′ of the respective footage systems.

The octave range of the tone source signals provided on the lines 430 through 432 is designated by the octave selection data $OS_1$–$OS_0$ latched by the latch circuit 282. Accordingly, resistance value of the tone level correction circuit 435 is changed in accordance with the contents of the octave selection data $OS_1$–$OS_0$. The tone level correction is applied only to the musical tone signals of the 4 foot and 8 foot systems on the lines 431 and 432. The musical tone signal of the 2 foot system on the line 430 is generally in a high octave range so that the level correction for each octave range is not effected.

If the musical tone signals on the lines 431 and 432 are ones of a low octave range selected by the octave selection data $OS_1$ or $OS_2$, resistors $R_1$, $R_2$, $R_{13}$ and $R_{11}$, $R_{12}$, $R_{13}$ provided in the series in the lines 431 and 432 are respectively connected in series resulting in maximum amount of attenuation of the musical tone. Accordingly, the tone level of the musical tone signal in the low octave range becomes relatively small. If the musical tone signals on the lines 431 and 432 are ones of the third octave range selected by the octave selection data $OS_3$, the field-effect transistors 436 and 437 are turned on by the data $OS_3$ outputted from the latch circuit 282 and the resistors $R_1$ and $R_{11}$ are thereby short-circuited. Accordingly, the musical tone signals are attenuated by the serially connected resistors $R_2$, $R_3$ and $R_{12}$, $R_{13}$ so that the tone level of the musical tone signal of the third octave range becomes relatively large as compared with the tone level of the musical tone signals in the low octave range. If the musical tone signals on the lines 431 and 432 are ones of the highest octave range (i.e. the fourth octave), transistors 438 and 439 are turned on by the data $OS_0$ outputted from the latch circuit 282 resulting in short-circuiting of the resistors $R_1$, $R_2$ and $R_{11}$, $R_{12}$. Accordingly, the musical tone signals of the highest octave range appearing on the lines 431 and 432 are attenuated only by the resistors $R_3$ and $R_{13}$ so that the tone level thereof becomes relatively the largest of all of the musical tone signals.

Gating of automatic chord tones

Tone source signals for the automatic chord performance are obtained on the basis of the lower keyboard tone source square wave signals of the respective footages provided on the lines 417 through 419 from the latch circuit 412. This is because the automatic chord tones are obtained by simultaneously producing tones of the keys being depressed in the lower keyboard at a timing of the automatic chord tone key-on signal $KO_3$.

Square wave signals of the 4 foot and 8 foot systems with a duty factor of 50% are applied from the lines 418 and 419 to an AND gate 440 to obtain a square wave signal (A8) of the 8 foot system with a duty factor of $\frac{1}{4}$. Similarly, square wave signals of the 2 foot and 4 foot systems with a duty factor of 50% are applied from the lines 417 and 418 an AND gate 441 to obtain a square wave signal (A4′) with a duty factor of $\frac{1}{4}$. The square wave signals of the respective footage systems appearing on the lines 410 through 419 are synchronized in their phase with one another. Accordingly, the square wave signals with a duty factor of exactly $\frac{1}{4}$ are obtained from the AND gates 440 and 441. These square wave signals of the 4 foot and 8 foot systems produced by the AND gates 440 and 441 are inputted to the second gating circuit 421 as the automatic chord tone source signals.

The second gating circuit 421 receives a signal from the automatic chord tone envelope control section 330. Being controlled by this control section 330, the second gating circuit 421 does not effect a gating operation if the automatic bass chord performance is not made. More specifically, if the automatic bass chord performance is not made, the automatic bass chord selection signal ABC latched by the latch circuit 331 is "0" and the automatic chord key-on signal $KO_3$ is "0" (the signal $KO_3$ is not produced unless the automatic bass chord is selected). Accordingly, the output of a NOR gate 442 is "1" and a field-effect transistor 443 is always in conduction. This causes the ground potential on a ground potential line 433 to be delivered on a line 444 so that the gating circuit 421 always outputs the ground potential. Accordingly, the musical tone signals A4′ and A8′ for the automatic chord are not produced.

If the automatic base chord performance is selected, the signal ABC is turned to "1" so that the output of a NOR gate 442 is turned to "1" and a field-effect transistor 443 is always maintained in an off state. Simultaneously, a field-effect transistor 445 is turned on in synchronization with the automatic chord tone key-on signal $KO_3$ latched by the latch circuit 331. As the transistor 445 is turned on, the negative voltage −5 V on the line 434 is charged in a capacitor 446. As the transistor 445 is turned off by falling of the key-on signal $KO_3$, the capacitor 446 is discharged through a resistor 447. Accordingly, a voltage waveform of the capacitor 446 which is charged and discharged in accordance with generation and extinguishment of the key-on signal $KO_3$ appears on the line 444. The pulse width of the key-on signal $KO_3$ is a short one of about 5 ms. If, accordingly, a relatively large value of resistance of a resistor 447 is selected, a percussion type envelope voltage waveform with a long decay time is obtained on the line 444.

In the gating circuit 421, a gating control is effected in accordance with the envelope voltage waveform on the line 444. When the level of the square wave signal outputted from the AND gates 440 and 441 is "0", the ground potential on the ground potential line 433 is delivered on output lines 448 and 449, whereas when the level of the square wave signal is "L", the envelope voltage waveform on the line 444 is delivered on the output lines 448 and 449. Accordingly, the tone source square wave signals of the 8 foot and 4 foot systems amplitude-modulated by the envelope voltage waveform provided on the line 444 are delivered on the line 444 are delivered on the lines 448 and 449. The tone source signals on the lines 448 and 449 are outputted as an 8 foot system automatic chord tone signal A8′ and a 4 foot system automatic chord tone signal A4′ are source-follower type field-effect transistors 450 and 451.

If a rhythm of slow rock is selected, a field-effect transistor 452 is turned on by a slow rock selection signal SR latched by the latch circuit 331 through the line 326 thereby causing a resistor 453 which is grounded at one terminal thereof to be connected to the line 444. Accordingly, a parallel circuit of the resistors 447 and 453 is formed with a result that time constant in discharging of the capacitor 446 is shortened. Consequently, if the slow rock rhythm is selected, the decay time of the amplitude envelope of the automatic chord tone is shortened.

The above described gating control for the automatic chord tones is simultaneously effected with respect to all of the lower keyboard tone generators 250 through 256.

Pedal kayboard tone generator

Figure 13:
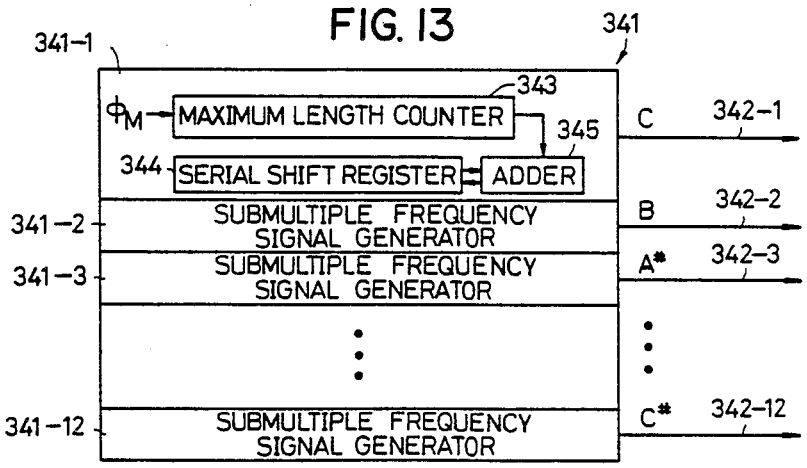
FIG. 13 is a block diagram illustrating in detail the submultiple frequency wave signal generator shown in FIG. 10.
Figure 17:
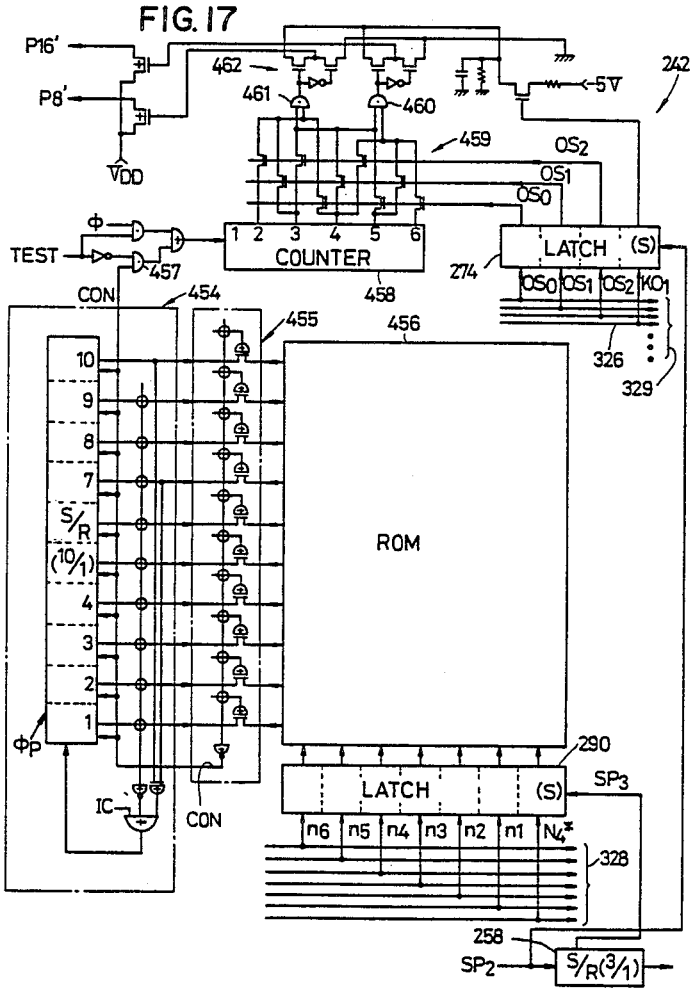
FIG. 17 is a circuit diagram showing the pedal keyboard tone generator shown in FIG. 10.

FIG. 17 shows an example of the pedal keyboard tone generator 242. The tone generator 242 is a digital type tone generator including a maximum length counter 454, a coincidence detection circuit 455 and read-only memory 456. A clock pulse $\phi p$ used for driving the maximum length counter 454 is oscillated from a source separate from the source of the master clock pulse $\phi_M$ used in the submultiple frequency signal generator 341 (FIGS. 10 and 13). Accordingly, the frequency-modulation of the master clock pulse $\phi_p$ for applying vibrato to the upper and lower keyboard tones in no way affects the clock pulse $\phi_p$ and vibrato is not applied to the pedal keyboard tones.

In accordance with contents of the note selection data $n_1$–$n_6$ and $N_4$* latched by the latch circuit 290, the read-only memory 456 reads out 10-bit digital data corresponding to the note of the pedal keyboard tone assigned to the pedal keyboard channel (i.e. the first channel). The coincidence circuit 455 composed of an exclusive OR gate compares contents of the maximum length counter 454 with contents of the digital data read from the read-only memory 456 and produces a coincidence detection pulse CON whenever they coincide with each other. This coincidence detection pulse CON sets all bits of the contents of the maximum length counter 454 to "1". The pulse CON corresponds to a signal of the highest frequency of the note assigned to the specified channel. The counter 458 divides this signal in frequency to form tone source signals of the respective octave ranges.

The tone source signals (square wave signals with a duty factor of 50%) outputted in parallel from the counter 458 are applied to an octave selection circuit 459 in which tone source signals of required octaves are selected in accordance with the octave selection data $OS_0$, $OS_1$ and $OS_2$. With respect to the pedal keyboard, the data $OS_3$ is not used (See Tables 3 and 4) so that the data $OS_3$ need not be latched. In the pedal keyboard, the data $OS_0$ represents the lowest octave range (See Tables 3 and 4).

The outputs of the octave selection circuit 459 is applied to AND gates 460 and 461 depending upon the footage system. The AND gate 460 is a circuit which produces a 16 foot system pedal keyboard tone source signal (P16′) in the form of a square wave signal with a duty factor of $\frac{1}{4}$. The AND gate 461 is a circuit which produces an 8 foot system pedal keyboard tone source signal (P8′) in the form of a square wave signal with a duty factor of $\frac{1}{4}$. In other words, the octave selection circuit 459 selects tone source signal (square wave signals with a duty factor of 50%) within three octave ranges in accordance with the octave selection data $OS_0$, $OS_1$ or $OS_2$. Among the three tone source signals, the adjacent two tone source signals (i.e., submultiple frequency signals whose frequencies are in a relation of 1:2) are inputted to the AND gates 460 and 461. As a result, a 16 foot system square wave signal with a duty factor of $\frac{1}{4}$ is provided by the AND gate 460 and an 8 foot system square wave signal with a duty factor of $\frac{1}{4}$ which is one octave higher is provided by the AND gate 461.

The tone source signals outputted by the respective AND gates 460 and 461 are applied to a gating circuit 462 in which these signals are gate-controlled in accordance with the first key-on signal $KO_1$ latched by the latching circuit 274. In this manner, the 8 foot system and 16 foot system pedal keyboard musical tone signals P8′ and P16′ are produced.

In a case where the digital tone generator 16 is made in the form of an integrated circuit, capacitors and discharging resistors in the gating circuit are provided outside of the integrated circuit as external component parts.

What is claimed is:

1. A keyboard electronic musical instrument having a specified number of tone production channels connected by a number of output lines, comprising:

a tone production assignment circuit for assigning production of a tone selected by depression of a key to one of said channels and generating key information representing the note name of the assigned tone and key-on information representing depression or release of the key with respect to each channel to which tone production has been assigned, said key information and said key-on information for each channel together having a certain total number of bits;

data dividing means, connected to said assignment circuit and having parallel output lines of a number which is smaller than said certain total number of bits of the key information and the key-on information for each channel, for dividing the key information and the key-on information of the tone assigned to the particular channel into groups of data, each group having a number of bits matching the number of said output lines;

data multiplexing means, cooperatively connected to said data dividing means, for time division multiplexing said groups of divided data by delivering each group of data on said output lines in parallel data format, said groups being delivered sequentially in time division multiplexed order; and a tone generator for generating the tone assigned to each channel in accordance with the multiplexed data.

2. An electronic musical instrument as defined in claim 1 wherein said data multiplexing means comprises means for periodically inserting data representing a reference timing in said output lines.

3. An electronic musical instrument as defined in claim 2 wherein said data multiplexing means further comprises means for inserting control information used commonly throughout all of the channels or used for only a specified channel in any one or more of the output lines at a suitable timing when component data of the key information or the key-on information is not provided on said one or more of the output lines.

4. An electronic musical instrument as defined in claim 1 wherein said data dividing means comprises:

first through N-th selection means for dividing said total number of bits of the key information and the key-on information into N groups (where N represents an integer of 2 or a larger number) with respect to each of the channels and for sequentially selecting each of the divided groups of data with a time delay; and wherein said data multiplexing means comprises:

gating means for selecting one or more control information used commonly throughout all of the channels or for only a specified channel at a predetermined timing;

OR gate groups having a specified number of parallel output lines for combining the outputs of said first through N-th selection means and said gating means;

control means for generating first through N-th pulses sequentially and repeatedly with a delay of a predetermined time period for controlling the timing of sequential selection by said first through N-th selection means;

timing pulse generation means for generating a timing pulse which controls the timing of selection by said gating means; and reference data insertion means for inputting a control pulse generated at a certain reference time within each repetitive cycle in which information of all of the channels is multiplexed, and for supplying a unique group of data representing the reference timing to said OR gate groups in response to said input control pulse.

5. An electronic musical instrument as defined in claim 4 which further comprises multiplexed data distribution means which receives the multiplexed data provided by said data multiplexing means through said output lines and distributes each of the multiplexed data to each of separate tone generators in accordance with the channel of the multiplexed data.

6. An electrical musical instrument as defined in claim 5 wherein said multiplexed data distribution means comprises:

means for detecting the data representing the reference timing from among the multiplexed data supplied by said data multiplexing means for generating a reference pulse in response to the detection;

shift means for successively shifting the reference pulse; and latch means for successively latching the multiplexed data provided by said data multiplexing means in accordance with the reference pulse successively shifted in said shift means thereby to distribute the key information and the key-on information contained in the multiplexed data to the respective channels.

*7. A polyphonic keyboard electronic musical instrument having a specified number of tone production channels, comprising:*

*key information generating means for generating key information relating to depressed ones among keys in a keyboard,*

*channel assignment means for assigning said key informations to available ones of the specified number of tone production channels,*

*multiplexing means for time division multiplexing said assigned key informations by delivering each key information in parallel data format, said key informations being delivered sequentially in time division multiplexed order;*

*tone generating means having the same number of tone generators as said specified number of tone production channels, each of said tone generators corresponding to a respective one of said tone production channels, and*

*demultiplexing means connected between said multiplexing means and said tone generating means for demultiplexing said delivered key informations and for supplying each demultiplexed key information to the tone generator corresponding to the tone production channel to which said delivered key information is assigned, so that said tone generators respectively generate tone signals in accordance with the respective supplied key information.*

*8. A polyphonic electronic musical instrument comprising:*

*keyboard means having a plurality of keys,*

*key information generating means for generating key information relating to depressed ones among said keys,*

*channel assignment means for assigning said key information to available ones of a specified number of tone production channels,*

*envelope information generating means for generating envelope information serving to determine an envelope characteristic of a tone, said envelope information being used commonly throughout all of said tone production channels,*

*multiplexing means connected to said channel assignment means and said envelope information generating means for transmitting said key information and said envelope information over output lines using a predetermined number of time slots, each of said key information being allotted to a predetermined time slot in accordance with the assigned tone production channel of the key information and the envelope information being allotted to a predetermined time slot on one or more of said output lines in which said key information is not provided,*

*tone generating means having tone generators each of which corresponds to a respective one of the tone production channels,*

*envelope imparting means having envelope imparting circuits each of which is connected to a respective one of said tone generators; and*

*demultiplexing means connected to said output lines for supplying said transmitted key information to the tone generators corresponding to said tone production channels to which said transmitted key information is assigned respectively and for supplying said transmitted envelope information to all of said envelope imparting circuits, said tone generators generating tone signals in accordance with said supplied key information respectively and said envelope imparting circuits imparting the envelope characteristic to the corresponding tone signals.*

*9. In a keyboard polyphonic electronic musical instrument of the type having plural tone generator channels, the number of such channels being considerably fewer than the total number of keys, the improvement comprising:*

*memory means storing a channel assignment table containing for each assigned channel a key code and associated key depression state data for the selected key which is assigned to that channel,*

*data transmission lines,*

*time division multiplex means for repetitively, consecutively transmitting the contained key codes and associated key depression state data via said data transmission lines during corresponding intervals in each time division multiplex cycle, and*

*demultiplexer means, connected to said data transmission lines and receiving said time division multiplex key codes and data, for demultiplexing the same and supplying to each tone generator channel only the demultiplexed key code and associated key depression state data for the selected key assigned to that channel.*

*10. An electronic musical instrument according to claim 9 further comprising:*

*envelope information generating means for producing envelope ascertaining information for common usage by all of said tone generator channels,*

*said multiplexer means including circuitry for transmitting said envelope ascertaining information from said envelope information generating means onto said data transmission lines as part of each time division multiplex cycle, and*

*an envelope imparting circuit in each tone generator channel, each envelope imparting circuit utilizing said transmitted common envelope ascertaining information and the key depression state data for the corresponding channel to impart the requisite envelope to the tone generated in that channel.*

*11. An electronic musical instrument according to claim 10 wherein said multiplexer means gates said envelope ascertaining information onto said data transmission lines at the beginning of each time division multiplex cycle.*

*12. A keyboard electronic musical instrument having a specified number of tone production channels connected by a number of output lines, comprising:*

*a tone production assignment circuit for assigning production of a tone selected by depression of a key to one of said channels and generating key information representing the note name of the assigned tone and key-on information representing depression or release of the key with respect to each channel to which tone production has been assigned, said key information and said key-on information for each channel together having a certain total number of bits;*

*a number of parallel output transmission lines;*

*data multiplexing means for time division multiplexing said key information and key-on information by delivering the same on said output transmission lines in parallel data format, said information being delivered sequentially in time division multiplexed order,*

*a tone generator for generating the tone assigned to each channel in accordance with the multiplexed information, and*

*means for inserting envelope control information used commonly throughout all of the channels or used for only a specified channel in any one or more of the output transmission lines at a suitable timing when component data of the key information or the key-on information is not provided on said one or more of the output transmission lines.*

*13. In a keyboard electronic musical instrument of the type having a small number of tone generator channels, for which channels key code and key depression state data are supplied in time division multiplex format, the improvement comprising:*

*assignment memory means containing a channel assignment table in which there is a data entry position for each tone generator channel,*

*first means for ascertaining by comparison with prior entered data in said table whether a key code for a selected key is already entered in said table and if not, for entering the key code and associated key depression state data for that selected key into an available data entry position of said table,*

*second means for reading out all of the entered key codes and associated key depression state data from said channel assignment table in a certain order and in certain delivery time zones for time division multiplex transmission to said tone generator channels, and*

*timing control means, cooperatively connected to said first and second means, for establishing a timing and order for key code and data entry into said table by said first means, and for establishing a different timing and order for readout and transmission of key codes and data from said table by said second means.*

* * * * *